United States Patent Office 3,262,791
Patented July 26, 1966

3,262,791
CORROSION PREVENTING METHOD AND COMPOSITION
Woodrow J. Dickson, La Habra, and Fred W. Jenkins, Buena Park, Calif., assignors to Petrolite Corporation, Wilmington, Del., a corporation of Delaware
No Drawing. Continuation of application Ser. No. 115,879, June 9, 1961, which is a division of application Ser. No. 47,387, Aug. 4, 1960. This application Oct. 24, 1965, Ser. No. 505,039
6 Claims. (Cl. 106—14)

This application is a continuation of our application Serial No. 115,879, filed on June 9, 1961, which is a division of application Serial No. 47,387, filed on August 4, 1960, now withdrawn as an application, and is co-pending with application Serial No. 458,373, filed on May 24, 1965, as a division of said application Serial No. 458,373, and is co-pending with each of the following applications, Serial Numbers:

| Serial No. | Filing Date | Title |
| --- | --- | --- |
| 115,875 | June 9, 1961 | Fuel Composition |
| 115,876 | June 9, 1961 | Process of Preventing Scale |
| 115,877 | June 9, 1961 | Process of Breaking Emulsions |
| 115,878 | June 9, 1961 | Lubrication Composition |
| 115,879 | June 9, 1961 | Preventing Corrosion |
| 115,881 | June 9, 1961 | Inhibiting Foam |
| 115,882 | June 9, 1961 | Flotation Process |
| 115,883 | June 9, 1961 | Drilling Fluids |
| 115,884 | June 9, 1961 | Treatment of Oil Wells |
| 308,063 | Sept. 11, 1963 | Anti-Stripping Agents |

Application Serial Numbers 47,387 and 115,879 are now abandoned.

This invention relates to polyalkyleneimines and to derivatives thereof. More particularly, this invention relates to polyethyleneimine and to polyethyleneimine derivatives containing various groups, such as the oxyalkylated, acylated, alkylated, carbonylated, olefinated, etc., derivatives thereof, prepared by introducing such groups individually, alternately, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as antioxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as deicing and anti-stalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24–D (toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

Polyalkyleneimine employed in this invention include high molecular weight polyethyleneimine, i.e. polymers of ethyleneimine, or substituted products thereof:

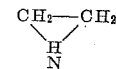

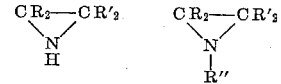

etc.

wherein R, R' and R" are hydrogen or a substituted group, for example a hydrocarbon group such as alkyl, cycloalkyl, aryl, aralkyl, alkaryl, etc., but preferably hydrogen or alkyl.

Thus, polyethyleneimine is polymerized, substituted or an unsubstituted, 1,2-alkyleneimine. Although polyethyleneimine is the preferred embodiment, other illustrative examples include, for example,

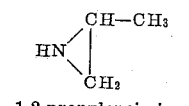

1,2-propyleneimine

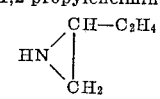

1,2-butyleneimine

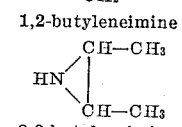

2,3-butyleneimine

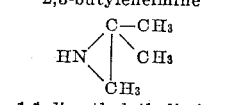

1,1-dimethylethylimine

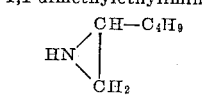

C-butylethyleneimine

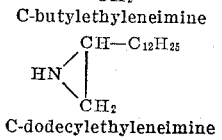

C-dodecylethyleneimine

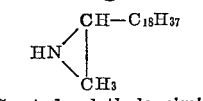

C-octadecylethyleneimine

A preferred class of polymerized 1,2-alkyleneimines include those derived from polymerizing

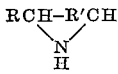

wherein R and R' are hydrogen or an alkyl radical, the latter being the same or different. Of the substituted ethyleneimines, propyleneimines are preferred.

The polyethyleneimines useful herein have molecular weights of, for example, at least 800, for example from 800 to 100,000 or higher, but preferably 20,000 to 75,000 or higher. There is no upper limit to the molecular weight of the polymer employed herein and molecular weights of 200,000, 500,000 or 1,000,000 or more can be employed.

The optimum molecular weight will depend on the particular derivative, the particular use, etc.

Although these products are generally prepared by polymerizing 1,2-alkyleneimines, they may also be prepared by other known methods, for example, by decarboxylating 2-oxazolidine as described in 2,806,839, etc.

Commercial examples of these compounds are available, for example, those sold by the Chemirad Corporation as "PEI" in a 50% by weight aqueous solution having a molecular weight of 30–40,000. Propyleneimine is also commercially available and suitable polymers can be prepared from this material.

For convenience and simplicity, this invention will be illustrated by employing polyethyleneimine.

Polyethyleneimine is a well known polymer whose preparation from ethyleneimine is described in U.S. Patent 2,182,306 and elsewhere. For convenience in polymerizing and handling, the polymer is generally prepared as an aqueous solution. Water can be removed, if desired, by distilling the water therefrom or by azeotroping the water therefrom in the presence of a hydrocarbon, such as xylene, and using the solution and/or suspension obtained thereby for further reaction or use. The following polyethyleneimines of the molecular weights indicated are employed herein to illustrate this invention.

| Polymer designation: | Approx. mol. wgt. range |
| --- | --- |
| Polyethyleneimine 900 | 800–1000 |
| Polyethyleneimine 5,000 | 4000–6000 |
| Polyethyleneimine 11,500 | 10,500–12,500 |
| Polyethyleneimine 20,000 | 18,000–22,000 |
| Polyethyleneimine 35,000 | 30,000–40,000 |
| Polyethyleneimine 50,000 | 40,000–60,000 |
| Polyethyleneimine 75,000 | 65,000–85,000 |
| Polyethyleneimine 100,000 | 80,000–125,000 |

ACYLATION

A wide variety of acylating agents can be employed. Acylation is carried out under dehydrating conditions, i.e., water is removed. Any of the well-known methods of acylation can be employed. For example, heat alone, heat and reduced pressure, heat in combination with an azeotroping agent, etc., are all satisfactory.

The temperature at which reaction between the acylating agent and polyethyleneimine is effected is not too critical a factor. Since the reactions involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and polyethyleneimine. In order to facilitate the removal of this water, to effect a more complete reaction in accordance with the principle of LeChatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azetropic mixture with water can be used. It is preferred, however, to use an aromatic hydrocarbon solvent of the benzene series. Non-limiting examples of the preferred solvent are benzene, toluene, and xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and polyethyleneimine is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than six carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxy-myristic acids, the hydroxypentadecanoic acids, the hydroxy-palmitic acids, the hydroxyhexadecanoic acids, the hydroxyheptadecanoic acids, the hydroxy stearic acids, the hydroxyoctadecanoic acids, for example, ricinoleic acid, ricinelardic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoyl-nonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof, (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

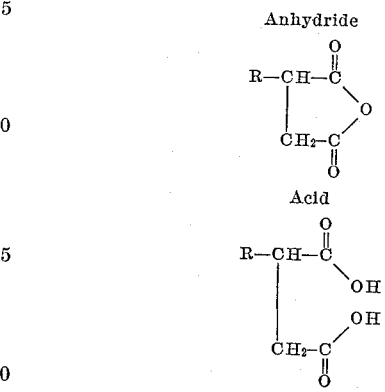

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are Ethenyl succinic acid anhydrides;
Ethenyl succinic acid;
Ethyl succinic acid anhydride;
Propenyl succinic acid anhydride;
Sulfurized propenyl succinic acid anhydride;
Butenyl succinic acid;
2-methylbutenyl succinic acid anhydride;
1,2-dichloropentyl succinic acid anhydride;
Hexenyl succinic acid anhydride;
Hexyl succinic acid;
Sulfurized 3-methylpentenyl succinic acid anhydride;
2,3-dimethylbutenyl succinic acid anhydride;
3,3-dimethylbutenyl succinic acid;
1,2-dibromo-2-ethylbutyl succinic acid;
Heptenyl succinic acid anhydride;
1,2-diiodooctyl succinic acid;
Octenyl succinic acid anyhdride;
2-methyl-heptenyl succinic acid anhydride;
4-ethyl-hexenyl succinic acid;
2-isopropylpentenyl succinic acid anhydride;
Noneyl succinic acid anhydride;
2-propylhexenyl succinic acid anhydride;
Decenyl succinic acid;
Decenyl succinic acid anhydride;
5-methyl-2-isopropylhexenyl succinic acid anhydride;
1,2-dibromo-2-ethyloctenyl succinic acid anhydride;
Decyl succinic acid anhydride;
Undecenyl succinic acid anhydride;
1,2-dichloro-undecyl succinic acid anhydride;
1,2-dichloro-undecyl succinic acid;
3-ethyl-2-t-butylpentenyl succinic acid anhydride;
Dodecenyl succinic acid anhydride;
Dodecenyl succinic acid;
2-propylnonenyl succinic acid anhydride;
3-butyloctenyl succinic acid anhydride;
Tridecenyl succinic acid anhydride;
Tetradecenyl succinic acid anhydride;
Hexadecenyl succinic acid anhydride;
Sulfurized octadecenyl succinic acid;
Octadecyl succinic acid anhydride;
1,2-dibrom-2-methylpentadecenyl succinic acid anhydride;
8-propylpentadecyl succinic acid anhydride;
Eicosenyl succinic acid anhydride;
1,2-dichloro-2-methylnonadecenyl succinic acid anhydride;
2-octyldodecenyl succinic acid;
1,2-diiodotetracosenyl succinic acid anhydride;
Hexacosenyl succinic acid;
Hexacosenyl succinic acid anhydride; and
Hentriacontenyl succinic acid anyhdride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cyclic amidine ring, the formation of acid imides such as might occur when anhydrides such as the alkenylsuccinic acids are reacted, i.e.

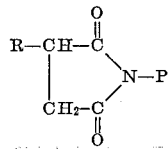

wherein P=the polyethyleneimine residue, polymers as might occur when a dicarboxylic acid is reacted intermolecularly with polyethyleneimine, cyclization as might occur when a dicarboxylic acid reacts intramolecularly with polyethyleneimine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with polyethyleneimine will depend on the number of acylation reactive positions contained therein as well as the number of moles of acylating agent one wishes to incorporate into the polymer. Theoretically one mole of acylating agent can be reacted per amino group on the polyethyleneimine molecule. We have advantageously reacted 1-20 moles of acylating agent per mole of polyethylene 900, but preferably 1-12 moles. Proportionately greater amounts of acylating agent can be employed with polyethyleneimine of higher molecular weight. Thus, with polyethyleneimine 20,000, 1-50 moles of acylating agent can be employed, and with polyethyleneimine 35,000, 1-100 moles can be employed, etc. Optimum acylation will depend on the particular use.

The following examples are illustrative of the preparation of the acylated polyethyleneimine.

The following general procedure is employed in acylating. A xylene suspension of polyethyleneimine, after the removal of water, is mixed with the desired ratio of acid. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired, the maximum temperature is generally 180-250° C. and more than one mole of water per carboxylic group is removed. The reaction times range from 4 to 24 hours. Here again, the true test of the degree of reaction is the amount of water removed.

TABLE I.—ACYLATED PRODUCTS OF POLYETHYLENEIMINE

| Ex. | Acid | Molecular Weight of Polyethyleneimine (PE) | Ratio, Mols of Acid Per Mol of PE | Ratio, Mols of Water Removed Per Mol of Acid |
|---|---|---|---|---|
| 1-A$_1$ | Lauric (200) | 900 | 10:1 | 1.12 |
| 1-A$_2$ | do | 900 | 8:1 | 1.3 |
| 1-A$_3$ | do | 900 | 6:1 | 1.5 |
| 1-A$_4$ | do | 900 | 5:1 | 1.1 |
| 1-A$_5$ | do | 900 | 4:1 | 1.85 |
| 1-A$_6$ | do | 900 | 1:1 | 2.0 |
| 1-A$_7$ | do | 900 | 1:1 | 1.1 |
| 2-A$_1$ | Oleic (282) | 5,000 | 6:1 | 1.3 |
| 2-A$_2$ | do | 5,000 | 5:1 | 1.02 |
| 2-A$_3$ | do | 5,000 | 4:1 | 1.6 |
| 2-A$_4$ | do | 5,000 | 1:1 | 2.0 |
| 3-A$_1$ | Acetic (60) | 11,500 | 10:1 | 1.3 |
| 3-A$_2$ | do | 11,500 | 5:1 | 1.8 |
| 3-A$_3$ | do | 11,500 | 2:1 | 1.1 |
| 3-A$_4$ | do | 11,500 | 1:1 | 1.2 |
| 4-A$_1$ | Palmitic (256.4) | 11,500 | 3:1 | 1.6 |

TABLE I—Continued

| Ex. | Acid | Molecular Weight of Polyethyleneimine (PE) | Ratio, Mols of Acid Per Mol of PE | Ratio, Mols of Water Removed Per Mol of Acid |
|---|---|---|---|---|
| 4-A$_2$ | ___do___ | 11,500 | 2:1 | 1.3 |
| 4-A$_3$ | ___do___ | 11,500 | 1:1 | 2.0 |
| 5-A$_1$ | Stearic (284) | 20,000 | 3:1 | 1.4 |
| 5-A$_2$ | ___do___ | 20,000 | 2:1 | 1.1 |
| 6-A$_1$ | Dimeric (600) (Emery Industries). | 20,000 | 3:1 | 1.5 |
| 6-A$_2$ | ___do___ | 20,000 | 2:1 | 2.0 |
| 6-A$_3$ | ___do___ | 20,000 | 1:1 | 1.1 |
| 6-A$_4$ | ___do___ | 20,000 | 1:2 | 2.0 |
| 7-A$_1$ | Nonanoic (158) | 50,000 | 3:1 | 1.1 |
| 7-A$_2$ | ___do___ | 50,000 | 2:1 | 1.6 |
| 7-A$_3$ | ___do___ | 50,000 | 1:1 | 1.5 |
| 8-A$_1$ | Myristic (228.4) | 50,000 | 3:1 | 1.1 |
| 8-A$_2$ | ___do___ | 50,000 | 2:1 | 1.9 |
| 8-A$_3$ | ___do___ | 50,000 | 1:1 | 1.3 |
| 9-A$_1$ | Alkenyl (C$_{12}$) Succinic Anhy. (266). | 50,000 | 6:1 | 1.5 |
| 9-A$_2$ | ___do___ | 50,000 | 4:1 | 1.6 |
| 9-A$_3$ | ___do___ | 50,000 | 2:1 | 1.4 |
| 10-A$_1$ | Naphthenic (330) (Sunaptic Acid B). | 50,000 | 2:1 | 1.8 |
| 10-A$_2$ | ___do___ | 50,000 | 1:1 | 1.2 |
| 11-A$_1$ | Maleic Anhydride (98) | 50,000 | 1:1 | |
| 11-A$_2$ | ___do___ | 50,000 | 0.8:1 | |
| 11-A$_3$ | ___do___ | 50,000 | 1:2 | |
| 12-A$_1$ | Oleic (282) | 100,000 | 2:1 | 1.6 |
| 12-A$_2$ | ___do___ | 100,000 | 1:1 | 1.4 |
| 13-A$_1$ | Diglycolic (134) | 100,000 | 1:1 | 1.0 |
| 13-A$_2$ | ___do___ | 100,000 | 1:2 | 2.0 |
| 14-A$_1$ | Diphenolic (286) | 100,000 | 2:1 | 1.1 |
| 14-A$_2$ | ___do___ | 100,000 | 1:1 | 1.1 |

Example 1–A$_7$

The reaction is carried out in a 5 liter, 3 necked flask furnished with a stirring device, thermometer, phase separating trap, condenser and heating mantle to 1 mole (900 grams) of polyethyleneimine 900 in an equal weight of xylene, (i.e., 900 grams), 200 grams of lauric acid (1 mole) is added with stirring in about ten minutes. The reaction mixture is then heated gradually to about 145° C. in half an hour and then held at about 160° C. over a period of 3 hours until 19 grams (1.1 moles) of water is collected in the side of the tube. The solvent is then removed with gentle heating under reduced pressure of approximately 20 mm. The product is a dark, viscous, xylene-soluble liquid.

Example 1–A$_6$

The prior example is repeated except that the final reaction temperature is maintained at 240° C. and 36 grams (2 moles) of water are removed instead of 19 grams (1.1 moles). Infrared analysis of the product indicates the presence of a cyclic amidine ring.

The following examples of acylated polyethyleneimines are prepared in the manner of the above examples from the polyethyleneimine noted in the following table. The products obtained are dark, viscous materials.

In the examples the symbol "A" identifies the acylated polyethyleneimine. Thus, specifically "1–A," represents acylated polyethyleneimine.

The following table presents specific illustration of compounds other than polyethyleneimine and its derivatives.

TABLE I-A.—ACYLATED PRODUCTS OF POLYPROPYLENEIMINE

| Ex. | Molecular Weight of Polypropyleneimine | Acid | Mols of Acid Per Mol of Polypropyleneimine | Mols of Water Removed Per Mol of Acid |
|---|---|---|---|---|
| 15-A$_1$ | 500 | Stearic (284) | 2:1 | 1.9 |
| 15-A$_2$ | 500 | ___do___ | 1:1 | 1.1 |
| 15-A$_3$ | 500 | Lauric (200) | 1:1 | 0.9 |
| 16-A$_1$ | 1,000 | Oleic (282) | 3:1 | 1.0 |
| 16-A$_2$ | 1,000 | Palmitic (256.4) | 1:1 | 1.2 |
| 16-A$_3$ | 1,000 | Acetic (60) | 2:1 | 1.0 |
| 17-A$_1$ | 5,000 | Stearic (284) | 1:1 | 2.0 |
| 17-A$_2$ | 5,000 | ___do___ | 3:1 | 1.3 |
| 17-A$_3$ | 5,000 | Dimeric (600) (Emery Industries). | 1:1 | 1.5 |
| 18-A$_1$ | 10,000 | Diglycolic (134) | 4:1 | 0.9 |
| 18-A$_2$ | 10,000 | Diphenolic (286) | 2:1 | 1.0 |
| 18-A$_3$ | 10,000 | Naphthenic (330) | 1:1 | 1.0 |
| 19-A$_1$ | 20,000 | Maleic Anhydride (98) | 1:1 | |
| 19-A$_2$ | 20,000 | Nonanoic (158) | 4:1 | 3.2 |
| 19-A$_3$ | 20,000 | Oleic (282) | 2:1 | 2.1 |
| 20-A$_1$ | 40,000 | Myristic (228.4) | 2:1 | 1.7 |
| 20-A$_2$ | 40,000 | Oleic (282) | 3:1 | 2.8 |
| 20-A$_3$ | 40,000 | Alkenyl (C$_{12}$) Succinic Anhydride (266). | 1:1 | |

OXYALKYLATION

Polyethyleneimine can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions of propylene oxide and ethylene oxide, or smaller proportions thereof in relation to polyethyleneimine. Thus, the molar ratio of alkylene oxide to polyethyleneimine can range within wide limits, for example, from a 1:1 mole ratio to a ratio of 1000:1, or higher, but preferably 1 to 200. For example, in demulsification extremely high alkylene oxide ratios are often advantageously employed such as 200–300 or more moles of alkylene oxide per mole of polyethyleneimine. On tne other hand, for certain applications such as corrosion prevention and use as fuel oil additives, lower ratios of alkylene oxides are advantageously employed, i.e., 1–10–25 moles of alkylene oxide per mole of polyethyleneimine. With higher molecular weight polyethyleneimine, more oxyalkylatable reaction centers are present for alkylene oxide addition and very high ratios of alkylene oxide can be added. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts 1 and 2 of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The symbol employed to designate oxyalkylation is "O." Specifically "1–O" represents oxyalkylated polyethyleneimine.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. Polyethyleneimine dissolved and/or suspended in an equal weight of xylene is charged into the reactor. The autoclave is sealed, swept with nitrogen, stirring started immediately and heat applied. The temperature is allowed to rise to approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

*Example 1–$O_1$*

Using the oxyalkylation apparatus and procedure stated above, the following compounds are prepared: 900 grams (1 mol) of polyethyleneimine 900 in xylene are charged into a stainless steel autoclave, swept with nitrogen, stirring started, and autoclave sealed. The temperature is allowed to rise approximately 100° C. and ethylene oxide is injected continuously until 220 grams (5 mols) total had been added over a one-half hour period. This reaction is exothermic and requires cooling to avoid a rise in temperature after removal of xylene. The reaction mass is transferred to a suitable container. Upon cooling to room temperature, the reaction mass is a dark extremely viscous liquid.

*Example 1–$O_2$*

The same procedure as Example 1–$O_1$ is used except that 396 grams of ethylene oxide (9 mols) is added to 900 grams (1 mol) of polyethyleneimine 900. This reaction material is a dark viscous liquid at room temperature.

*Example 1–$O_3$*

The same procedure as Example 1–$O_1$ is used and 396 grams of ethylene oxide (9 mols) are added to 900 grams (1 mol) of polyethyleneimine 900. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of polyethyleneimine 900 and a total of 22 mols of reacted ethylene oxide.

*Example 1–$O_4$*

A portion of the reaction mass of Example 1–$O_3$ is transferred to another autoclave and an additional amount of EtO was added. The reaction mass now contains the ratio of 1 mol of polyethyleneimine 900 to 40 mols of EtO.

*Example 1–$O_5$*

The addition of ethylene oxide to Example 1–$O_4$ is continued until a molar ratio of 1 mol of polyethyleneimine 900 to 75 mols of EtO is reached.

*Example 1–$O_6$*

The addition of ethylene oxide to Example 1–$O_5$ is continued until a molar ratio of 1 mol of polyethyleneimine 900 to 83 mols of EtO is reached.

*Example 1–$O_7$*

The addition of ethylene oxide to the Example 1–$O_6$ is continued until a molar ratio of 1 mol of polyethyleneimine 900 to 105 mols of EtO is reached.

*Example 16–$O_1$*

2,000 grams (0.1 mol) of polyethyleneimine of molecular weight of 20,000 in xylene are charged into a conventional stainless steel autoclave. The temperature is raised to 120° C., the autoclave is flushed with nitrogen and sealed. Then 11.6 grams of propylene oxide (0.2 mols) are added slowly at 120° C. A sample is taken at this point and labeled 16–$O_1$. This sample contains two mols of PrO for each mol of polyethyleneimine. It is a dark, pasty solid at room temperature.

*Example 16–$O_2$*

The addition of propylene oxide to 16–$O_1$ is continued as follows: The autoclave is opened and 5 grams of sodium methylate are added. The autoclave is again purged with nitrogen and sealed. Propylene oxide is added carefully until an additional 23.2 grams have been reacted. A sample is taken at this point and labeled 16–$O_2$. This compound now contains 6 mols of propylene oxide for each mol of polyethyleneimine 20,000.

*Example 16–$O_3$*

The oxypropylation of 16–$O_2$ is continued until an additional 52.2 grams of propylene oxide are reacted. A sample is taken at this point and labeled 16–$O_3$. 16–$O_3$ contains 15 mols of propylene oxide for each mol of polyethyleneimine 20,000. At room temperature the product is a dark, pasty solid.

This oxyalkylation is continued to produce Examples 16–$O_4$, 16–$O_5$.

A summary of oxyalkylated products produced from polyethyleneimines is presented in the following Table II.

The Roman numerals (I), (II), and (III) besides the moles of oxide added indicate the order of oxide addition (I) first, (II) second and (III) third, etc.

The following abbreviations are also used throughout this application:

Eto—Ethylene oxide
PrO—Propylene oxide
BuO—Butylene oxide

TABLE II.—OXYALKYLATED PRODUCTS
[Mols of alkylene oxide/mol polyethyleneimine]

| Ex. | Mol. Wt. of PE | EtO | PrO | BuO | Physical Properties |
|---|---|---|---|---|---|
| 1-$O_1$ | 900 | 5 | | | Viscous liquid. |
| 1-$O_2$ | 900 | 9 | | | Solid. |
| 1-$O_3$ | 900 | 22 | | | Do. |
| 1-$O_4$ | 900 | 40 | | | Do. |
| 1-$O_5$ | 900 | 75 | | | Do. |
| 1-$O_6$ | 900 | 83 | | | Do. |
| 1-$O_7$ | 900 | 105 | | | Do. |
| 1-$O_8$ | 900 | 200 | | | Do. |
| 2-$O_1$ | 900 | | 5 | | Viscous liquid. |
| 2-$O_2$ | 900 | | 11 | | Do. |
| 2-$O_3$ | 900 | | 20 | | Dark, thick liquid. |
| 2-$O_4$ | 900 | | 50 | | Do. |
| 2-$O_5$ | 900 | | 80 | | Do. |
| 2-$O_6$ | 900 | | 115 | | Do. |
| 2-$O_7$ | 900 | | 190 | | Do. |
| 2-$O_8$ | 900 | | 230 | | Do. |
| 3-$O_1$ | 900 | | | 4 | Do. |
| 3-$O_2$ | 900 | | | 15 | Do. |
| 3-$O_3$ | 900 | | | 35 | Do. |
| 3-$O_4$ | 900 | | | 60 | Do. |
| 4-$O_1$ | 900 | 10 (I) | 10 (II) | | Viscous liquid. |
| 4-$O_2$ | 900 | 10 (I) | 10 (II) | | Do. |
| 4-$O_3$ | 900 | 30 (II) | 10 (I) | | Solid. |
| 4-$O_4$ | 900 | 50 (II) | 60 (I) | | Do. |
| 5-$O_1$ | 900 | | Glycidol, | 4 mols | Viscous liquid. |
| 6-$O_1$ | 900 | 10 (II) | 10 (I) | 12 (III) | Dark, thick liquid. |
| 6-$O_2$ | 900 | 5 (III) | 50 (I) | 5 (I) | Do. |
| 6-$O_3$ | 900 | 18 (I) | 12 (III) | 10 (II) | Do. |
| 6-$O_4$ | 900 | 20 (I) | 90 (II) | 5 (III) | Do. |
| 7-O | 900 | Octylene oxide, 8 mols | | | Viscous liquid. |
| 8-O | 900 | Styrene oxide, 5 mols | | | Do. |
| 9-O | 900 | Epoxide 201 (Carbide & Carbon), 1 mol | | | Solid. |
| 10-$O_1$ | 5,000 | 1 | | | Viscous liquid. |
| 10-$O_2$ | 5,000 | 7 | | | Do. |
| 10-$O_3$ | 5,000 | 15 | | | Solid. |
| 10-$O_4$ | 5,000 | 30 | | | Do. |
| 10-$O_5$ | 5,000 | 60 | | | Do. |
| 10-$O_6$ | 5,000 | 120 | | | Do. |
| 11-$O_1$ | 5,000 | | 3 | | Viscous liquid. |
| 11-$O_2$ | 5,000 | | 20 | | Dark, thick liquid. |
| 11-$O_3$ | 5,000 | | 40 | | Do. |
| 11-$O_4$ | 5,000 | | 80 | | Do. |
| 11-$O_5$ | 5,000 | | 160 | | Do. |
| 12-$O_1$ | 5,000 | | | 5 | Do. |
| 12-$O_2$ | 5,000 | | | 10 | Do. |
| 12-$O_3$ | 5,000 | | | 15 | Do. |
| 12-$O_4$ | 5,000 | | | 20 | Do. |
| 13-$O_1$ | 5,000 | 20 (I) | 20 (II) | | Viscous liquid. |
| 13-$O_2$ | 5,000 | 15 (I) | 80 (II) | | Solid. |
| 13-$O_3$ | 5,000 | 5 (II) | 45 (I) | | Do. |
| 13-$O_4$ | 5,000 | 10 (II) | 10 (I) | | Do. |
| 14-$O_1$ | 5,000 | 5 (III) | 5 (II) | 5 (I) | Viscous liquid. |
| 14-$O_2$ | 5,000 | 15 (I) | 10 (III) | 5 (I) | Do. |
| 14-$O_3$ | 5,000 | 5 (I) | 40 (II) | 15 (III) | Do. |
| 14-$O_4$ | 5,000 | 35 (I) | 10 (II) | 10 (III) | Solid. |
| 14-$O_5$ | 5,000 | 10 (II) | 15 (I) | 20 (III) | Viscous liquid. |
| 14-$O_6$ | 5,000 | 6 (III) | 3 (I) | 2 (II) | Do. |
| 15-$O_1$ | 20,000 | 10 | | | Solid. |
| 15-$O_2$ | 20,000 | 35 | | | Do. |
| 15-$O_3$ | 20,000 | 60 | | | Do. |
| 15-$O_4$ | 20,000 | 85 | | | Do. |
| 15-$O_5$ | 20,000 | 105 | | | Do. |
| 15-$O_6$ | 20,000 | 140 | | | Do. |
| 16-$O_1$ | 20,000 | | 2 | | Dark, pasty solid. |
| 16-$O_2$ | 20,000 | | 6 | | Do. |
| 16-$O_3$ | 20,000 | | 15 | | Do. |
| 16-$O_4$ | 20,000 | | 35 | | Do. |
| 16-$O_5$ | 20,000 | | 60 | | Do. |
| 17-$O_1$ | 20,000 | 4 (I) | 4 (II) | | Pasty solid. |
| 17-$O_2$ | 20,000 | 15 (I) | 30 (II) | | Do. |
| 17-$O_3$ | 20,000 | 30 (II) | 30 (I) | | Do. |
| 17-$O_4$ | 20,000 | 7 (II) | 18 (I) | | Do. |
| 18-$O_1$ | 20,000 | 5 (I) | 15 (II) | | Solid. |
| 18-$O_2$ | 20,000 | 5 (I) | 40 (III) | 6 (II) | Light brown solid. |
| 18-$O_3$ | 20,000 | 15 (II) | 10 (I) | 30 (III) | Do. |
| 18-$O_4$ | 20,000 | 3 (II) | 8 (III) | 16 (I) | Do. |
| 18-$O_5$ | 20,000 | 20 (III) | 80 (I) | 3 (II) | Do. |
| 18-$O_6$ | 20,000 | 6 (III) | 18 (II) | 6 (I) | Do. |
| 19-$O_1$ | 50,000 | 2 | | | Do. |
| 19-$O_2$ | 50,000 | 6 | | | Do. |
| 19-$O_3$ | 50,000 | 15 | | | Solid. |
| 19-$O_4$ | 50,000 | 30 | | | Do. |
| 19-$O_5$ | 50,000 | 50 | | | Do. |
| 19-$O_6$ | 50,000 | 100 | | | Do. |
| 19-$O_7$ | 50,000 | 200 | | | Do. |
| 19-$O_8$ | 50,000 | 400 | | | Hard solid. |
| 20-$O_1$ | 50,000 | | 5 | | Pasty solid. |
| 20-$O_2$ | 50,000 | | 20 | | Do. |
| 20-$O_3$ | 50,000 | | 40 | | Do. |
| 20-$O_4$ | 50,000 | | 80 | | Do. |
| 20-$O_5$ | 50,000 | | 160 | | Do. |
| 20-$O_6$ | 50,000 | | 320 | | Do. |
| 21-O | 50,000 | Epichlorohydrin, | | 3 mols | Do. |
| 22-$O_1$ | 50,000 | 18 (I) | 4 (II) | 4 (III) | Waxy solid. |
| 22-$O_2$ | 50,000 | 6 (II) | 12 (I) | 12 (III) | Do. |
| 22-$O_3$ | 50,000 | 14 (III) | 22 (II) | 10 (I) | Do. |
| 22-$O_4$ | 50,000 | 5 (I) | 48 (III) | 6 (II) | Do. |
| 22-$O_5$ | 50,000 | 1 (II) | 10 (I) | 3 (III) | Do. |
| 22-$O_6$ | 50,000 | 10 (III) | 80 (I) | 10 (II) | Do. |
| 23-$O_1$ | 100,000 | 1 | | | Do. |
| 23-$O_2$ | 100,000 | 5 | | | Do. |
| 23-$O_3$ | 100,000 | 14 | | | Do. |
| 23-$O_4$ | 100,000 | 24 | | | Do. |
| 23-$O_5$ | 100,000 | 48 | | | Do. |
| 23-$O_6$ | 100,000 | 60 | | | Do. |
| 23-$O_7$ | 100,000 | 75 | | | Do. |
| 23-$O_8$ | 100,000 | 150 | | | Do. |
| 24-$O_1$ | 100,000 | | 1 | | Do. |
| 24-$O_2$ | 100,000 | | 3 | | Do. |
| 24-$O_3$ | 100,000 | | 5 | | Do. |
| 24-$O_4$ | 100,000 | | 10 | | Do. |
| 24-$O_5$ | 100,000 | | 20 | | Do. |
| 24-$O_6$ | 100,000 | | 40 | | Do. |
| 24-$O_7$ | 100,000 | | 80 | | Do. |
| 24-$O_8$ | 100,000 | | 160 | | Do. |
| 24-$O_9$ | 100,000 | | 320 | | Do. |
| 24-$O_{10}$ | 100,000 | | 640 | | Do. |
| 25-$O_1$ | 100,000 | 25 (I) | 10 (II) | | Do. |
| 25-$O_2$ | 100,000 | 3 (I) | 3 (II) | 4 (III) | Do. |
| 25-$O_3$ | 100,000 | 5 (II) | 25 (I) | 30 (III) | Do. |
| 25-$O_4$ | 100,000 | 6 (II) | 16 (I) | 28 (III) | Do. |
| 26-$O_1$ | 100,000 | 8 (III) | 8 (II) | 8 (I) | Do. |
| 26-$O_2$ | 100,000 | 6 (III) | 10 (I) | 4 (II) | Do. |
| 26-$O_3$ | 100,000 | 5 (II) | 15 (III) | 3 (I) | Do. |
| 26-$O_4$ | 100,000 | 15 (II) | 20 (I) | 6 (III) | Do. |
| 26-$O_5$ | 100,000 | 2 (I) | 25 (II) | 2 (III) | Do. |
| 26-$O_6$ | 100,000 | 4 (I) | 14 (III) | 6 (II) | Do. |

The following table presents specific illustration of compounds other than polyethyleneimine and its derivatives.

TABLE II-A.—OXYALKYLATED PRODUCTS OF POLYPROPYLENEIMINE

| Ex. | Mol. Weight of Polypropyleneimine | Mols of Alkylene Oxide Per Mol of Polypropyleneimine | | | Physical Properties |
|---|---|---|---|---|---|
| | | EtO | PrO | BuO | |
| 27-$O_1$ | 500 | 1 | | | Viscous liquid. |
| 27-$O_2$ | 500 | 5 | | | Do. |
| 27-$O_3$ | 500 | 10 | | | Solid. |
| 27-$O_4$ | 500 | 20 | | | Do. |
| 27-$O_5$ | 500 | 50 | | | Do. |
| 27-$O_6$ | 500 | 100 | | | Do. |
| 28-$O_1$ | 500 | | 1 | | Viscous liquid. |
| 28-$O_2$ | 500 | | 5 | | Do. |
| 28-$O_3$ | 500 | | 10 | | Do. |
| 28-$O_4$ | 500 | | 20 | | Do. |
| 28-$O_5$ | 500 | | 50 | | Do. |
| 28-$O_6$ | 500 | | 100 | | Do. |
| 28-$O_7$ | 500 | | 200 | | Do. |
| 29-$O_1$ | 500 | | | 1 | Do. |
| 29-$O_2$ | 500 | | | 5 | Do. |
| 29-$O_3$ | 500 | | | 10 | Do. |
| 29-$O_4$ | 500 | | | 20 | Do. |
| 29-$O_5$ | 500 | | | 40 | Do. |
| 30-$O_1$ | 500 | 5 (I) | 10 (II) | | Do. |
| 30-$O_2$ | 500 | 10 (I) | 5 (II) | | Paste. |
| 31-$O_1$ | 500 | 20 (II) | 3 (I) | | Solid. |
| 31-$O_2$ | 500 | 12 (II) | 44 (I) | | Thick dark liquid. |
| 32-$O_1$ | 500 | 5 (III) | 5 (I) | 10 (I) | Do. |
| 32-$O_2$ | 500 | 10 (II) | 40 (I) | 3 (III) | Do. |
| 32-$O_3$ | 500 | 15 (I) | 80 (II) | 1 (III) | Do. |
| 32-$O_4$ | 500 | 5 (I) | 20 (III) | 2 (II) | Do. |
| 33-O | 500 | Octylene oxide, 5 mols | | | Do. |
| 34-O | 500 | Styrene oxide, 3 mols | | | Do. |
| 35-O | 500 | Epoxide 201 (Carbide & Carbon), 1 mol | | | Solid. |
| 36-$O_1$ | 1,000 | 1 | | | Viscous liquid |
| 36-$O_2$ | 1,000 | 3 | | | Do. |
| 36-$O_3$ | 1,000 | 12 | | | Solid. |
| 36-$O_4$ | 1,000 | 18 | | | Do. |
| 36-$O_5$ | 1,000 | 50 | | | Do. |
| 36-$O_6$ | 1,000 | 100 | | | Do. |
| 36-$O_7$ | 1,000 | 300 | | | Waxy solid. |
| 37-$O_1$ | 1,000 | | 5 | | Viscous liquid. |
| 37-$O_2$ | 1,000 | | 10 | | Do. |
| 37-$O_3$ | 1,000 | | 20 | | Do. |
| 37-$O_4$ | 1,000 | | 40 | | Do. |
| 37-$O_5$ | 1,000 | | 80 | | Do. |
| 38-$O_1$ | 1,000 | 10 (I) | 20 (II) | | Do. |
| 38-$O_2$ | 1,000 | 15 (II) | 5 (I) | | Solid. |
| 39-$O_1$ | 1,000 | 4 (I) | 3 (II) | 2 (III) | Viscous liquid. |
| 39-$O_2$ | 1,000 | 6 (I) | 10 (III) | 3 (II) | Do. |
| 39-$O_3$ | 1,000 | 14 (III) | 2 (I) | 8 (II) | Solid. |
| 39-$O_4$ | 1,000 | 10 (II) | 10 (III) | 10 (I) | Thick liquid. |

TABLE II—Continued

| Ex. | Mol. Weight of Poly-propylene-imine | Mols of Alkylene Oxide Per Mol of Polypropyleneimine | | | Physical Properties |
|---|---|---|---|---|---|
| | | EtO | PrO | BuO | |
| 40-O | 1,000 | Epoxide 201 (Carbide & Carbon), 2 mols | | | Solid. |
| 41-O | 1,000 | Styrene oxide, 6 mols | | | Viscous liquid. |
| 42-O | 1,000 | Octylene oxide, 2 mols | | | Do. |
| 43-O$_1$ | 5,000 | 1 | | | Do. |
| 43-O$_2$ | 5,000 | 5 | | | Do. |
| 43-O$_3$ | 5,000 | 20 | | | Solid. |
| 43-O$_4$ | 5,000 | 45 | | | Do. |
| 43-O$_5$ | 5,000 | 75 | | | Do. |
| 43-O$_6$ | 5,000 | 125 | | | Do. |
| 44-O$_1$ | 5,000 | | 3 | | Viscous liquid. |
| 44-O$_2$ | 5,000 | | 12 | | Thick liquid. |
| 44-O$_3$ | 5,000 | | 35 | | Do. |
| 44-O$_4$ | 5,000 | | 60 | | Do. |
| 44-O$_5$ | 5,000 | | 100 | | Do. |
| 44-O$_6$ | 5,000 | | 140 | | Do. |
| 44-O$_7$ | 5,000 | | 200 | | Do. |
| 45-O$_1$ | 5,000 | 5 (III) | 40 (II) | 3 (I) | Viscous liquid. |
| 45-O$_2$ | 5,000 | 10 (II) | 80 (III) | 10 (I) | Do. |
| 45-O$_3$ | 5,000 | 20 (I) | 40 (II) | 4 (III) | Do. |
| 45-O$_4$ | 5,000 | 2 (I) | 4 (III) | 2 (II) | Do. |
| 46-O$_1$ | 5,000 | | | 1 | Do. |
| 46-O$_2$ | 5,000 | | | 3 | Do. |
| 46-O$_3$ | 5,000 | | | 10 | Do. |
| 46-O$_4$ | 5,000 | | | 20 | Do. |
| 46-O$_5$ | 5,000 | | | 40 | Do. |
| 46-O$_6$ | 5,000 | | | 80 | Do. |
| 47-O | 5,000 | Epichlorohydrin, 2 mols | | | Do. |
| 48-O$_1$ | 10,000 | 3 | | | Pasty solid. |
| 48-O$_2$ | 10,000 | 6 | | | Do. |
| 48-O$_3$ | 10,000 | 15 | | | Do. |
| 48-O$_4$ | 10,000 | 30 | | | Do. |
| 48-O$_5$ | 10,000 | 90 | | | Do. |
| 49-O$_1$ | 10,000 | | 2 | | Do. |
| 49-O$_2$ | 10,000 | | 5 | | Do. |
| 49-O$_3$ | 10,000 | | 20 | | Do. |
| 49-O$_4$ | 10,000 | | 50 | | Do. |
| 50-O$_1$ | 10,000 | | | 1 | Do. |
| 50-O$_2$ | 10,000 | | | 3 | Do. |
| 50-O$_3$ | 10,000 | | | 10 | Do. |
| 51-O$_1$ | 10,000 | 6 (II) | 10 (III) | 14 (I) | Do. |
| 51-O$_2$ | 10,000 | 22 (III) | 1 (II) | 4 (I) | Do. |
| 51-O$_3$ | 10,000 | 6 (I) | 2 (II) | 3 (III) | Do. |
| 51-O$_4$ | 10,000 | 5 (I) | 18 (III) | 2 (II) | Do. |
| 52-O | 10,000 | Octylene oxide, 4 mols | | | Do. |
| 53-O | 10,000 | Epoxide 201 (Carbide & Carbon) 1 mol | | | Do. |
| 54-O$_1$ | 20,000 | 1 | | | Waxy solid. |
| 54-O$_2$ | 20,000 | 5 | | | Do. |
| 54-O$_3$ | 20,000 | 25 | | | Do. |
| 54-O$_4$ | 20,000 | 75 | | | Do. |
| 54-O$_5$ | 20,000 | 150 | | | Do. |
| 55-O$_1$ | 20,000 | | 1 | | Do. |
| 55-O$_2$ | 20,000 | | 3 | | Do. |
| 55-O$_3$ | 20,000 | | 8 | | Do. |
| 55-O$_4$ | 20,000 | | 20 | | Do. |
| 55-O$_5$ | 20,000 | | 40 | | Do. |
| 55-O$_6$ | 20,000 | | 80 | | Do. |
| 56-O$_1$ | 20,000 | | | 1 | Do. |
| 56-O$_2$ | 20,000 | | | 2 | Do. |
| 56-O$_3$ | 20,000 | | | 3 | Do. |
| 56-O$_4$ | 20,000 | | | 5 | Do. |
| 56-O$_5$ | 20,000 | | | 10 | Do. |
| 56-O$_6$ | 20,000 | | | 20 | Do. |
| 57-O$_1$ | 20,000 | 6 (I) | 16 (II) | 4 (III) | Do. |
| 57-O$_2$ | 20,000 | 5 (III) | 40 (I) | 2 (II) | Do. |
| 57-O$_3$ | 20,000 | 20 (II) | 60 (I) | 5 (III) | Do. |
| 57-O$_4$ | 20,000 | 5 (I) | 15 (III) | 8 (II) | Do. |
| 58-O$_1$ | 40,000 | 2 | | | Do. |
| 58-O$_2$ | 40,000 | 10 | | | Do. |
| 58-O$_3$ | 40,000 | 15 | | | Do. |
| 58-O$_4$ | 40,000 | 20 | | | Do. |
| 59-O$_1$ | 40,000 | | 5 | | Do. |
| 59-O$_2$ | 40,000 | | 10 | | Do. |
| 59-O$_3$ | 40,000 | | 20 | | Do. |
| 59-O$_4$ | 40,000 | | 40 | | Do. |
| 59-O$_5$ | 40,000 | | 80 | | Do. |
| 60-O$_1$ | 40,000 | | | 1 | Do. |
| 60-O$_2$ | 40,000 | | | 3 | Do. |
| 60-O$_3$ | 40,000 | | | 10 | Do. |
| 60-O$_4$ | 40,000 | | | 20 | Do. |
| 61-O$_1$ | 40,000 | 3 (I) | 2 (IIII) | 6 (II) | Do. |
| 61-O$_2$ | 40,000 | 40 (I) | 5 (II) | 3 (III) | Do. |
| 61-O$_3$ | 40,000 | 3 (II) | 18 (III) | 6 (I) | Do. |
| 61-O$_4$ | 40,000 | 2 (I) | 2 (I) | 2 (III) | Do. |
| 62-O$_1$ | 40,000 | 20 (I) | 20 (II) | | Do. |
| 62-O$_2$ | 40,000 | 5 (II) | 40 (I) | | Do. |

ACYLATION THEN OXYALKYLATION

Prior acylated polyethyleneimine can be oxyalkylated in the above manner by starting with acylated polyethyleneimine instead of the unreacted polymer. Non-limiting examples are presented in the following tables. The polyethyleneimine is "AO." Specifically "1-A$_4$O$_1$" represents acylated, then oxyalkylated polyethyleneimine.

Example 1-A$_5$O$_3$

For this example an autoclave equipped to handle alkylene oxides is necessary. 1671 grams (1 mole) of 1-A$_5$ are charged into the autoclave. Following a nitrogen purge and the addition of 75 grams of sodium methylate, the temperature is raised to 135° C. and 2436 grams of PrO (42 mols) are added. At the completion of this reaction, 440 grams of EtO (10 mols) are added and the reaction allowed to go to completion. The resulting polymer is a dark viscous fluid soluble in an aromatic solvent. Ratio of reactants 1 mole starting material/PrO 42 mols/EtO 10 mols.

Example 2-A$_4$O

For this example a conventional autoclave equipped to handle alkylene oxides is necessary. 525 grams of 2-A$_4$ (0.1 mol) are charged into the autoclave. The charge is catalyzed with 20 grams of sodium methylate, purged with nitrogen and heated to 150° C. 24.6 grams (0.2 mole) of styrene oxide are added and reacted for four hours with agitation. The resulting product is a dark extremely viscous fluid. Ratio of reactants 1 mole starting material/2 moles EtO.

These reactions and other reactions are summarized in the following table.

TABLE III.—OXYALKYLATED, PRIOR ACYLATED POLYETHYLENEIMINE

[Mols of oxide per mol of reactant]

| Example | EtO | PrO | BuO | Physical Property |
|---|---|---|---|---|
| 1-A$_5$O$_1$ | 5 | | | Viscous liquid. |
| 1-A$_5$O$_2$ | | 22 | | Do. |
| 1-A$_5$O$_3$ | 10 (II) | 42 (I) | | Do. |
| 1-A$_5$O$_4$ | 14 (III) | 26 (II) | 10 (I) | Do. |
| 1-A$_5$O$_5$ | 4 (I) | 12 (II) | | Do. |
| 1-A$_5$O$_6$ | | | 8 | Do. |
| 2-A$_4$O | Styrene Oxide, 2 mols | | | Dark, viscous liquid. |
| 4-A$_2$O | 24 | | | Solid. |
| 5-A$_2$O | 2 (I) | 4 (II) | 6 (III) | Thick liquid. |
| 6-A$_1$O | | 6 | | Do. |
| 9-A$_2$O | Octylene oxide, 5 mols | | | Do. |
| 10-A$_1$O$_1$ | 4 (II) | 28 (I) | | Do. |
| 10-A$_1$O$_2$ | 35 | | | Solid. |
| 10-A$_1$O$_3$ | | | 10 | Viscous liquid. |
| 11-A$_3$O$_1$ | | 5 | | Do. |
| 11-A$_3$O$_2$ | 8 (III) | 60 (II) | 2 (I) | Do. |
| 12-A$_2$O$_1$ | 12 | | | Solid. |
| 12-A$_2$O$_2$ | 4 (II) | 5 (I) | | Do. |

The following table presents specific illustration of compounds other than polyethyleneimine and its derivatives.

TABLE III-A.—OXYALKYLATED, PRIOR ACYLATED POLYPROPYLENEIMINE

| Example | EtO | PrO | BuO | Physical Property |
|---|---|---|---|---|
| 15-A$_2$O$_1$ | | 10 | | Viscous liquid. |
| 15-A$_2$O$_2$ | 3 | | | Do. |
| 15-A$_2$O$_3$ | 2 (I) | 2 (II) | | Do. |
| 15-A$_2$O$_4$ | 6 (II) | 10 (III) | 2 (I) | Do. |
| 15-A$_2$O$_5$ | | | 4 | Do. |
| 16-A$_1$O | Epoxide 201 (Carbide & Carbon), 1 mol | | | Do. |
| 17-A$_3$O$_1$ | 10 (II) | 80 (I) | | Do. |
| 17-A$_3$O$_2$ | | | 20 | Do. |
| 18-A$_3$O$_1$ | 3 | | | Pasty solid. |
| 18-A$_3$O$_2$ | Octylene oxide, 5 mols | | | Do. |
| 18-A$_3$O$_3$ | 20 (II) | | 5 (I) | Do. |
| 18-A$_3$O$_4$ | | 8 | | Do. |
| 19-A$_3$O$_1$ | Styrene oxide, 3 mols | | | Do. |
| 19-A$_3$O$_2$ | 5 (III) | 40 (II) | 2 (I) | Do. |
| 19-A$_3$O$_3$ | 12 (II) | 65 (I) | | Do. |
| 20-A$_1$O$_1$ | Epichlorohydrin, 2 mols | | | Do. |
| 20-A$_1$O$_2$ | 1 | | | Do. |
| 20-A$_1$O$_3$ | | 3 | | Do. |

OXYALKYLATION THEN ACYLATION

The prior oxyalkylated polyethyleneimine can be acylated with any of the acylation agents herein disclosed (in contrast to acylation prior to oxyalkylation). Since these reactants also have hydroxy groups, acylation, in addition to reaction with amino groups noted above, also includes esterification.

The method of acylation in this instance is similar to that carried out with polyethyleneimine itself, i.e., dehydration wherein the removal of water is a test of the completion of the reaction.

Example 1-$O_1A_1$

One mole of 1-$O_1$ (1120 grams) in 500 ml. of xylene is mixed with three moles of acetic acid (180 grams) at room temperature. The temperature is raised slowly to 120–130° C. and refluxed gently for one hour. The temperature is then raised to 150–160° C. and heated until 3 moles of water and all of the xylene are stripped off. The dark product is water-soluble.

Example 2-$O_4A$ 0.1 mole of 2-$O_4$ (380 grams) in 400 ml. of xylene is mixed with 0.1 mole of palmitic acid (25.6 grams) at room temperature. Ratio 1 mole 2-$O_4$ to 1 mole of palmitic acid. Vacuum is applied and the temperature is raised slowly until one mole of water (18 grams) is removed. This product is a dark viscous liquid.

Example 2-$O_6A$ 0.1 mole of 2-$O_6$ (757 grams) is mixed with 500 grams of xylene and heated to 100° C. 0.1 mole of diglycolic acid (13.4 grams) is added slowly to prevent excessive foaming. Ratio 1 mole 2-$O_6$ to 1 mole glycolic acid. The temperature is raised to 140–150° C. and held until one mole of water has evolved. This product is the diglycolic acid fractional ester of 2-$O_6$. A white precipitate forms during this reaction which can be removed by filtration. Analysis shows the precipitate to be sodium acid diglycollate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—ACYLATED, PRIOR OXYALKYLATED POLYETHYLENEIMINE

| Example | Acylating Agent | Mols of Acylating Agent Per Mol Oxyalkylated PE | Ratio, Mols of Water Removed to Mols Acylating Agent Employed | Physical Properties |
| --- | --- | --- | --- | --- |
| 1-$O_1A_1$ | Acetic | 3 | 1 | Dark viscous liquid. |
| 1-$O_1A_2$ | Lauric | 1 | 1 | Do. |
| 1-$O_5A$ | Acetic | 2 | 1 | Solid. |
| 2-$O_3A$ | Oleic | 3 | 1 | Do. |
| 2-$O_4A$ | Palmitic | 1 | 1 | Do. |
| 2-$O_6A$ | Diglycolic | 1 | 1 | Do. |
| 4-$O_2A$ | Stearic | 2 | 1 | Do. |
| 6-$O_1A$ | Maleic anhydride | 1 | | Viscous liquid. |
| 12-$O_2A$ | Myristic | 2 | 1 | Do. |
| 13-$O_3A$ | Abietic | 1 | 1 | Do. |
| 14-$O_6A$ | Palmitic | 2 | 1 | Do. |
| 15-$O_3A$ | Tall oil | 1 | 1 | Do. |
| 16-$O_5A$ | Diglycolic | 1 | 1 | Do. |
| 17-$O_3A$ | Oleic | 1 | 2 | Do. |
| 18-$O_5A$ | Lauric | 2 | 1 | Do. |
| 19-$O_1A$ | Ricinoleic | 1 | 1 | Do. |
| 20-$O_6A$ | Maleic anhydride | 1 | | Do. |
| 22-$O_5A$ | Linoleic | 3 | 1 | Do. |
| 23-$O_2A$ | Palmitic | 1 | 1 | Do. |
| 24-$O_4A$ | Acetic | 1 | 1 | Do. |
| 25-$O_3A_1$ | Dimeric (Emery Indus) | 1 | 1 | Solid. |
| 25-$O_3A_2$ | Diglycolic | 1 | 1 | Do. |
| 26-$O_1A$ | Diphenolic | 1 | 1 | Do. |
| 26-$O_5A$ | Terephthalic | 1 | 1 | Do. |
| 26-$O_6A$ | Benzoic | 1 | 1 | Do. |

The following table presents specific illustration of compounds other than polyethyleneimine and its derivatives.

TABLE IV-A.—ACYLATED, PRIOR OXYALKYLATED POLYPROPYLENEIMINE

| Example | Acylating Agent | Mols of Acylating Agent Per Mol of Oxyalkylated Polypropyleneimine | Ratio Mols of Water Removed to Mols of Acylating Agent Employed | Physical Properties |
| --- | --- | --- | --- | --- |
| 27-$O_2A$ | Oleic | 2 | 2 | Thick dark liquid. |
| 27-$O_4A$ | Diphenolic | 1 | 1 | Pasty solid. |
| 28-$O_3A$ | Lauric | 3 | 1 | Do. |
| 28-$O_6A$ | Acetic | 4 | 1 | Do. |
| 29-$O_2A$ | Naphthenic | 1 | 1 | Do. |
| 31-$O_2A$ | Stearic | 2 | 2 | Do. |
| 32-$O_4A$ | Tall oil | 1 | 1 | Do. |
| 37-$O_1A$ | Maleic anhydride | 1 | | Do. |
| 39-$O_2A$ | Palmitic | 2 | 2 | Do. |
| 43-$O_5A$ | Dimeric (Emery Industries) | 3 | 1 | Waxy solid. |
| 44-$O_5A$ | Diglycolic | 1 | 1 | Pasty solid. |
| 45-$O_1A$ | Myristic | 2 | 1 | Do. |
| 48-$O_3A$ | Ricinoleic | 1 | 1 | Do. |
| 50-$O_2A$ | Abietic | 2 | 2 | Do. |
| 51-$O_1A$ | Linoleic | 1 | 1 | Do. |
| 57-$O_3A$ | Nonanoic | 1 | 1 | Do. |
| 59-$O_5A$ | Lauric | 1 | 1 | Waxy solid. |
| 62-$A_2A$ | Diglycolic | 1 | 1 | Do. |

HEAT TREATMENT OF OXYALKYLATED PRODUCTS

The oxyalkylated products described herein, for example, those shown in Table II relating to oxyalkylated polyethyleneimine and those in Table III relating to oxyalkylated, prior acylated, polyethyleneimine can be heat treated to form useful compositions.

In general, the heat treatment is carried out at 200–250° C. Under dehydrating conditions, where reduced pressure and a fast flow of nitrogen is used, lower temperatures can be employed, for example 150–200° C.

Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly less than 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the original reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc. fosters the reaction.

The following examples are presented to illustrate heat treatment. The symbol used to designate a heat treated oxyalkylated polyethyleneimine is "OH" and an acylated, oxyalkylated product is "AOH." In all examples 500 grams of starting material are employed.

Example 2-$O_1H$

A conventional glass resin vessel equipped with a stirrer and water trap is used. Five hundred grams of 2-$O_1$ are charged into the above resin vessel along with five grams of $CaCl_2$. The temperature is raised to 225–250° C. and heated until 57 grams of water (3.2 mols) are evolved. This process takes 7.5 hours of heating. The product is an extremely viscous material at room temperature. However, upon warming slightly this product dissolves easily in water.

Example 19-$O_3H$

The process of the immediately previous example is repeated using 19-$O_3$ but substituting sodium methylate for calcium chloride. The product is a dark, viscous, water-soluble material.

Example 15-$O_6H$

The process of Example 2-$O_1H$ is repeated using 15-$O_6$ but substituting powdered iron for calcium chloride.

TABLE V.—HEAT TREATED (1) OXYALKYLATED AND (2) ACYLATED, OXYALKYLATED POLYETHYLENEIMINE

| Ex. | Reaction Temp., °C. | Catalyst (5 grams) | Water Removed | | Time in Hours | Physical Properties |
|---|---|---|---|---|---|---|
| | | | Grams | Mols | | |
| 1-$O_2H$ | 250 | Iron | 74 | 4.1 | 8.0 | Dark, viscous liquid. |
| 2-$O_1H$ | 225 | $CaCl_2$ | 57 | 3.2 | 16.5 | Do. |
| 3-$O_5H$ | 265 | Sodium methylate | 36 | 2.0 | 23 | Do. |
| 7-OH | 270 | $CaCl_2$ | 38 | 2.1 | 30 | Do. |
| 10-$O_2H$ | 255 | Iron | 95 | 5.3 | 9.5 | Solid. |
| 11-$O_1H$ | 240 | ---do--- | 32 | 1.8 | 12 | Viscous liquid. |
| 12-$O_3H$ | 260 | ---do--- | 40 | 2.2 | 13 | Do. |
| 13-$O_4H$ | 250 | $CaCl_2$ | 72 | 4 | 18 | Do. |
| 14-$O_1H$ | 200 | Iron oleate | 54 | 3 | 24 | Do. |
| 15-$O_6H$ | 265 | $CaCl_2$ | 90 | 5 | 30 | Do. |
| 16-$O_4H$ | 255 | Iron | 54 | 3 | 16 | Do. |
| 17-$O_1H$ | 235 | ---do--- | 36 | 2 | 18 | Do. |
| 19-$O_3H$ | 275 | Sodium methylate | 76 | 4.2 | 20 | Solid. |
| 20-$O_1H$ | 255 | Iron | 54 | 3 | 16 | Viscous liquid. |
| 22-$O_5H$ | 265 | ---do--- | 63 | 3.5 | 8 | Do. |
| 23-$O_3H$ | 255 | ---do--- | 57 | 3.2 | 12 | Do. |
| 24-$O_4H$ | 250 | ---do--- | 36 | 2 | 14 | Do. |
| 25-$O_2H$ | 260 | ---do--- | 38 | 2.1 | 11 | Do. |
| 26-$O_3H$ | 265 | ---do--- | 40 | 2.2 | 13 | Do. |
| 1-$A_5O_1H$ | 225 | Sodium methylate | 36 | 2.0 | 16 | Paste. |
| 5-$A_2OH$ | 240 | Iron | 40 | 2.2 | 8 | Do. |
| 11-$A_3O_1H$ | 235 | Iron oleate | 90 | 5 | 14 | Do. |
| 12-$A_2O_2H$ | 260 | $CaCl_2$ | 32 | 1.8 | 18 | Do. |

The following table presents specific illustration of compounds other than polyethyleneimine and its derivatives.

TABLE V-A.—HEAT TREATED (1) OXYALKYLATED AND (2) ACYLATED, OXYALKYLATED POLYPROPYLENEIMINE

| Ex. | Reaction Temp., °C. | Catalyst (5 grams) | Water Removed | | Time in Hours | Physical Properties |
| --- | --- | --- | --- | --- | --- | --- |
| | | | Grams | Mols | | |
| 27-O$_3$H | 260 | CaCl$_2$ | 32 | 1.8 | 18 | Dark, viscous liquid. |
| 28-O$_5$H | 240 | Iron Oleate | 40 | 2.2 | 8 | Do. |
| 29-O$_2$H | 265 | Iron | 40 | 2.2 | 13 | Do. |
| 30-O$_1$H | 250 | Sodium Methylate | 36 | 2.0 | 14 | Do. |
| 32-O$_1$H | 265 | Iron | 63 | 3.5 | 8 | Do. |
| 36-O$_3$H | 275 | do | 76 | 4.2 | 20 | Do. |
| 37-O$_1$H | 255 | do | 54 | 3.0 | 16 | Do. |
| 43-O$_3$H | 200 | do | 54 | 3.0 | 24 | Pasty. |
| 46-O$_3$H | 260 | do | 40 | 2.2 | 13 | Viscous Liquid. |
| 47-O$_1$H | 260 | Iron Oleate | 95 | 5.3 | 9.5 | Do. |
| 48-O$_4$H | 255 | Ferric Chloride | 36 | 2.0 | 23 | Do. |
| 51-O$_3$H | 270 | Iron | 74 | 4.1 | 8.0 | Do. |
| 52-O$_1$H | 225 | Aluminum Chloride | 32 | 1.8 | 18 | Do. |
| 55-O$_3$H | 250 | CaCl$_2$ | 90 | 5.0 | 14 | Do. |
| 56-O$_4$H | 235 | Sodium Methylate | 36 | 2.0 | 16 | Do. |
| 58-O$_2$H | 240 | Iron | 38 | 2.1 | 11 | Do. |
| 15-A$_2$O$_1$H | 255 | do | 57 | 3.2 | 12 | Paste. |
| 17-H$_3$O$_2$H | 245 | do | 54 | 3.0 | 16 | Do. |
| 19-A$_3$O$_1$H | 270 | Iron Oleate | 36 | 2.0 | 18 | Do. |
| 20-A$_1$O$_1$H | 265 | CaCl$_2$ | 90 | 5.0 | 30 | Do. |
| 20-A$_1$O$_3$H | 255 | Iron | 32 | 1.8 | 12 | Do. |

ALKYLATION

Alkylation relates to the reaction of polyethyleneimine and derivatives thereof with alkylating agents.

Any hydrocarbon halide, e.g., alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-chlorowax have been set forth in United States Patent 2,238,790.

Since the reaction between the alkyl halide reactant and polyethyleneimine is a condensation reaction, or an alkylation reaction, characterized by the elimination of hydrogen halide, the general conditions for such reactions are applicable herein. For certain uses it is preferable to carry out the reaction at temperature of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and polyethyleneimine in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and polyethyleneimine is dependent on the weight of the charge, the reaction temperature selected, and the means employed for removing the hydrogen halide from the reaction mixture. In practice, the reaction is continued until no more hydrogen halide is formed. In general, the time of reaction will vary widely, such as between about four and about ten hours.

It can be postulated that the reaction between the alkyl halide reactant and polyethyleneimine results in the formation of products where the alkyl group of the alkylhalide has replaced a hydrogen atom attached to a nitrogen atom. It is also conceivable that alkylation of an alkylene group of polyethyleneimine can occur. However, the exact composition of any given reaction product cannot be predicted. For example, when two moles of butyl bromide are reacted with one mole of polyethyleneimine 900, a mixture of mono-, di- and tri- and higher N-alkylated products can be produced. Likewise, the alkyl groups can be substituted on different nitrogen atoms in different molecules of polyethyleneimine.

Thus, the term "alkylation" as employed herein and in the claims include alkenylation, cycloalkenylation, aralkylation, etc., and other hydrocarbonylation as well as alkylation itself.

In general, the following examples are prepared by reacting the alkyl halide with the polyethyleneimine at the desired ratio in the presence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate alkylation of polyethyleneimine.

In these examples, the term "mesomer" is employed. A mesomer is defined as a *repeating radical* which, when combined with other mesomers, forms the principal portion of the polymer molecule.

Thus, the unit

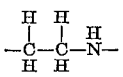

is the "mesomer" of polyethyleneimine, since polyethyleneimine may be represented by the formula

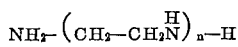

Example 5K₂

430 grams of polyethyleneimine 50,000, equivalent to 10 mesomeric units of ethyleneimine, in 500 ml. of xylene and 570 grams of sodium carbonate, equivalent to 8 moles, are placed in a reaction vessel equipped with a mechanical stirrer, a thermometer and a reflux condenser take-off for removal of volatile components. The stirred reactants are heated to about 100° C. whereupon 1140 g. (8 mols) of dichloroethyl ether is started in slowly at such a rate that the temperature of the reaction vessel contents never exceeds 165° C., but preferably stays around 135° C. The reaction is exothermic and 5–6 hours are required to add all the dichloroethyl ether. After all the dichloroethyl ether has been added, the temperature is allowed to drop to about 90–100° whereupon reduced pressure is applied to the reaction vessel and all xylene stripped out. The material left in the vessel is a thick brown liquid which solidifies upon cooling to a glassy-solid.

Example 8–A₁

The equivalent of 8 mesomeric units, based on polyethyleneimine, of the material 8–A₁ (Table I) in 300 g. xylene is placed in a reaction vessel described in the above example for 5–K₂. 340 grams anhydrous sodium carbonate, equivalent to 3.2 moles are added followed by 1.6 moles dimethyl sulfate. The temperature is then brought up to 125° C. and held there for a period of 6–8 hours. Xylene is then removed under reduced temperature and pressure conditions as in the example for 5–K₂. The resulting product, a dark amber material, is very viscous at ordinary temperature.

Example 20–O₁HK

The equivalent of 10 mesomeric units based on polyethyleneimine of the material 20–O₁H (Table V) in 300 ml. of xylene and 420 grams sodium bicarbonate, equivalent to 5 moles, are placed in an autoclave equipped with a stirring device, a thermometer and a condenser reflux device which can be closed off from the autoclave during reactions in which pressures above atmosphere are experienced. The autoclave is closed and heat is applied to bring up the temperature to 120–130° C. at which time 5 mols methyl chloride are added slowly while never allowing pressure to exceed 5 atmospheres pressure. Several hours will be necessary to get all methyl chloride in and pressure inside the vessel down to one atmosphere. At this point the reflux condenser is opened, the temperature is allowed to drop to 90–100° C. and a slight vacuum applied in order to reflux the xylene out of the autoclave. The resulting material is a very viscous amber colored liquid.

The reactions shown in the following table are carried out in a similar manner. Each reaction in the table is carried out in two ways—(1) in the presence of base, as in 5–K₂ to yield the alkylation product and (2) in the absence of base to yield the halogen-containing or sulfate-containing (5–K₂X) products.

The alkylated products of this invention contain primary, secondary, tertiary, and quaternary amino groups. By controlling the amount of alkylation agent employed and the conditions of the reaction, etc., one can control the type and amount of alkylation. For example, by reaction less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with polyethyleneimine will depend on the number of alkylation reactive positions contained therein as well as the number of moles of alkylating agent one wishes to incorporate into the molecule. Theoretically, every hydrogen bonded to a nitrogen atom can be alkylated. We have advantageously reacted 1–20 moles of alkylating agent per moles of polyethyleneimine 900 but preferably 1–12 moles. With polyethyleneimine 20,000 greater amounts of alkylating agent can be employed, for example 1–50 moles, and with polyethyleneimine 40,000, 1–100 moles, etc. Optimum alkylation will depend on the particular application.

In addition, the alkyl halide may contain functional groups. For example, chloroacetic acid can be reacted with polyethyleneimine to yield a compound containing carboxylic acid groups.

wherein P is the residue of polyethyleneimine.

In addition, polyethyleneimine can be alkylated with an alkyl halide such as alkyl chloride and then reacted with chloroacetic acid to yield an alkylated polyethyleneimine containing carboxylic acid groups

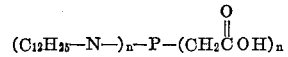

The symbol employed to designate an alkylated polyethyleneimine is "K." Where the product is a salt or a quaternary the symbol is "KX." Thus, for example, where no acceptor base is employed and a salt is allowed to form 1–A₅O₅K would be 1–A₅O₅KX.

TABLE VI.—ALKYLATED PRODUCTS

| Ex. | Mol. Wt. PE | Alkylating Agent | Mols Alkylating Agent Per Mesomer Unit | Physical Properties |
|---|---|---|---|---|
| 1-K₁ | 900 | Allyl chloride | 0.2 | Viscous liquid. |
| 1-K₂ | 900 | ....do.... | 0.7 | Do. |
| 1-K₃ | 900 | Benzyl chloride | 0.3 | Do. |
| 1-K₄ | 900 | ....do.... | 0.8 | Solid. |
| 2-K₁ | 5,000 | Methyl chloride | 0.3 | Viscous liquid. |
| 2-K₂ | 5,000 | ....do.... | 1.0 | Solid. |
| 2-K₃ | 5,000 | Ethylene dichloride | 0.2 | Viscous liquid. |
| 2-K₄ | 5,000 | ....do.... | 0.5 | Do. |
| 3-K₁ | 11,500 | 1,4-dichlorobutene-2 | 0.2 | Do. |
| 3-K₂ | 11,500 | ....do.... | 0.5 | Do. |
| 3-K₃ | 11,500 | Dimethyl sulfate | 0.2 | Do. |
| 3-K₄ | 11,500 | ....do.... | 0.4 | Do. |
| 4-K₁ | 20,000 | Dodecylbenzene chloride | 0.2 | Solid. |
| 4-K₂ | 20,000 | ....do.... | 0.5 | Do. |
| 4-K₃ | 20,000 | Butyl chloride | 0.3 | Viscous liquid. |
| 4-K₄ | 20,000 | ....do.... | 0.6 | Do. |
| 5-K₁ | 50,000 | Dichlorodiethylether | 0.2 | Do. |
| 5-K₂ | 50,000 | ....do.... | 0.8 | Solid. |
| 5-K₃ | 50,000 | Benzyl chloride | 0.3 | Viscous liquid. |
| 5-K₄ | 50,000 | ....do.... | 0.8 | Solid. |

TABLE VI—Continued

| Ex. | Mol. Wt. PE | Alkylating Agent | Mols Alkylating Agent Per Mesomer Unit | Physical Properties |
|---|---|---|---|---|
| 6-K₁ | 100,000 | Ethylene dichloride | 0.2 | Viscous liquid. |
| 6-K₂ | 100,000 | ___do___ | 0.8 | Do. |
| 6-K₃ | 100,000 | Methyl chloride | 0.3 | Do. |
| 6-K₄ | 100,000 | ___do___ | 1.0 | Solid. |
| 1-A₇K | | 1,4 xylidene chloride | 0.2 | Viscous liquid. |
| 2-A₄K | | ___do___ | 0.2 | Do. |
| 3-A₃K | | Dodecenyl chloride | 0.2 | Solid. |
| 4-A₂K | | Methyl chloride | 0.5 | Viscous liquid. |
| 6-A₄K | | Benzyl chloride | 0.4 | Solid. |
| 8-A₁K | | Dimethyl sulfate | 0.2 | Viscous liquid. |
| 12-A₂K | | Dichlorodiethyl ether | 0.4 | Do. |
| 1-O₂K | | 1,4-dichlorobutene-2 | 0.3 | Do. |
| 2-O₁K | | Benzyl chloride | 0.4 | Solid. |
| 3-O₂K | | Methyl chloride | 0.7 | Do. |
| 4-O₁K | | Ethylene dichloride | 0.2 | Viscous liquid. |
| 6-O₂K | | Benzyl chloride | 0.4 | Solid. |
| 11-O₂K | | Dimethyl sulfate | 0.2 | Viscous liquid. |
| 14-O₁K | | Dichlorodiethyl ether | 0.4 | Solid. |
| 16-O₄K | | Methyl chloride | 0.6 | Do. |
| 19-O₂K | | Dodecyl benzyl chloride | 0.2 | Do. |
| 19-O₄K | | 1,4 xylylene dichloride | 0.2 | Viscous liquid. |
| 20-O₁K | | Benzyl chloride | 0.5 | Solid. |
| 22-O₅K | | Methyl chloride | 0.6 | Do. |
| 23-O₁K | | Dodecenyl chloride | 0.2 | Do. |
| 24-O₄K | | Ethylene dichloride | 0.3 | Viscous liquid. |
| 1-A₅O₁K | | 1,4-dichlorobutene-2 | 0.2 | Do. |
| 1-A₅O₅K | | Benzyl chloride | 0.4 | Solid. |
| 5-A₂OK | | Dichlorodiethyl ether | 0.4 | Do. |
| 12-A₂O₂K | | Methyl chloride | 0.5 | Do. |
| 1-O₁A₁K | | Octadecyl chloride | 0.2 | Do. |
| 2-O₆AK | | Benzyl chloride | 0.4 | Do. |
| 14-O₆AK | | Dichlorodiethyl ether | 0.3 | Viscous liquid. |
| 22-O₅AK | | Methyl chloride | 0.6 | Do. |
| 26-O₅AK | | Benzyl chloride | 0.6 | Solid. |
| 1-O₂HK | | ___do___ | 0.4 | Do. |
| 7-OHK | | Dichlorodiethyl ether | 0.2 | Viscous liquid. |
| 11-O₁HK | | Ethylene dichloride | 0.2 | Do. |
| 20-O₁HK | | Methyl chloride | 0.5 | Do. |
| 25-O₂HK | | Dimethyl sulfate | 0.2 | Do. |

The following table presents specific illustration of compounds other than polyethyleneimine and its derivatives.

In addition to the above examples wherein a base acceptor is employed to remove the acid anion such as halo-

TABLE VI-A.—ACYLATED PRODUCTS

| Example | Molecular Weight of Polypropyleneimine | Alkylating Agent | Mols of Alkylating Agent Per Mesomer Unit | Physical Properties |
|---|---|---|---|---|
| 7-K₁ | 500 | Allyl chloride | 0.2 | Viscous liquid. |
| 7-K₂ | 500 | ___do___ | 0.7 | Do. |
| 7-K₃ | 500 | Benzyl chloride | 0.3 | Do. |
| 7-K₄ | 500 | ___do___ | 0.8 | Do. |
| 8-K₁ | 1,000 | Methyl chloride | 0.7 | Do. |
| 8-K₂ | 1,000 | ___do___ | 1.0 | Do. |
| 8-K₃ | 1,000 | Ethylene dichloride | 0.2 | Do. |
| 8-K₄ | 1,000 | ___do___ | 0.5 | Do. |
| 9-K₁ | 5,000 | 1-4-chlorobutene-2 | 0.2 | Do. |
| 9-K₂ | 5,000 | ___do___ | 0.5 | Do. |
| 9-K₃ | 5,000 | Dimethyl sulfate | 0.2 | Do. |
| 9-K₄ | 5,000 | ___do___ | 4 | Do. |
| 10-K₁ | 10,000 | Dodecylbenzene chloride | 0.2 | Solid. |
| 10-K₂ | 10,000 | ___do___ | 0.5 | Do. |
| 10-K₃ | 10,000 | Butyl chloride | 0.3 | Do. |
| 10-K₄ | 10,000 | ___do___ | 0.6 | Do. |
| 11-K₁ | 20,000 | Dichlorodiethyl ether | 0.2 | Do. |
| 11-K₂ | 20,000 | ___do___ | 0.8 | Do. |
| 11-K₃ | 20,000 | Benzyl chloride | 0.3 | Do. |
| 11-K₄ | 20,000 | ___do___ | 0.8 | Do. |
| 12-K₁ | 40,000 | Methyl chloride | 0.3 | Do. |
| 12-K₂ | 40,000 | ___do___ | 0.8 | Do. |
| 12-K₃ | 40,000 | Allyl chloride | 0.5 | Do. |
| 15-A₂K | | Dimethyl sulfate | 0.8 | Viscous liquid. |
| 16-A₃K | | Methyl chloride | 0.3 | Do. |
| 17-A₁K | | Ethylene dichloride | 0.8 | Do. |
| 18-A₃K | | Dichlorodiethyl ether | 0.2 | Solid. |
| 19-A₂K | | Benzyl chloride | 0.6 | Do. |
| 20-A₁K | | 1-4-dichlorobutene-2 | 0.3 | Do. |
| 27-O₄K | | Dodecenyl chloride | 0.5 | Viscous liquid. |
| 28-O₂K | | Benzyl chloride | 0.2 | Do. |
| 29-O₃K | | 1,4 xylylene dichloride | 1.0 | Do. |
| 36-O₄K | | Dodecyl benzene chloride | 0.8 | Do. |
| 44-O₅K | | Dimethyl sulfate | 0.3 | Solid. |
| 50-O₂K | | Ethylene dichloride | 0.7 | Do. |
| 51-O₂K | | Butyl chloride | 0.2 | Do. |
| 55-O₃K | | Allyl chloride | 0.5 | Do. |
| 61-O₂K | | Benzyl chloride | 0.3 | Viscous liquid. |
| 15-A₂O₄K | | Methyl chloride | 1.0 | Solid. |
| 19-A₃O₁K | | Ethylene dichloride | 0.6 | Do. |
| 19-A₃O₃K | | Dichloro pentane | 0.5 | Do. |
| 27-O₂AK | | Dichlorodiethyl ether | 0.2 | Do. |
| 44-O₅AK | | Dimethyl sulfate | 1.0 | Do. |
| 51-O₄AK | | Methyl chloride | 0.8 | Do. |
| 46-O₃HK | | Allyl chloride | 0.5 | Do. |
| 20-A₁O₂HK | | Butyl chloride | 0.2 | Do. | gen, sulfate, etc., the above examples are also prepared omitting the inorganic base from the reaction medium. When this is done, a halogen containing salt, quaternary, etc., is formed. Examples where such salts are formed will be designated as above except that they will contain an "X" designation for example instead of 1–$O_1A_1K$ they will be 1–$O_1A_1KX$, and instead of 22–$O_5AK$ they will be 22–$O_5AKX$, etc. "X" indicates salt formation.

ALKYLATED THEN ACYLATION

The alkylated material prepared above can be further treated with acylating agent where residual acylatable amino groups are still present on the molecule. The acylation procedure is essentially that described above wherein carboxylic acids react with the alkylated polyethyleneimine under dehydrating conditions to form amides and cyclic amidines. The product depends on the ratio of moles of water removed for each carboxylic acid group, i.e., 1 mole water/1 mole carboxylic essentially amides; more than 1 mole water/1 mole carboxylic acid group, essentially cyclic amidines, such as imidazolines.

Such compounds are illustrated in the following table. The symbol employed to designate alkylated, acylated products is "KA" and acylated, alkylated, acylated products is "AKA."

OLEFINATION

Olefination relates to the reaction of polyethyleneimine and derivatives with olefins.

The compositions of this invention, including polyethyleneimine itself as well as reaction products thereof containing active hydrogens, can be reacted with unsaturated compounds, particularly compounds containing activated double bonds, so as to add polyethyleneimine across the double bonds as illustrated herein:

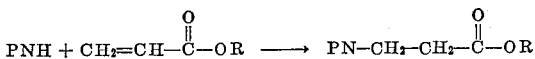

where the compound contains an additional active hydrogen, other unsaturated molecules can be added to the original molecule for example:

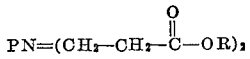

Where one or more active hydrogens are present at another reactive site, the following reaction could take place:

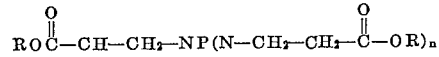

TABLE VII.—ACYLATED, PRIOR ALKYLATED POLYETHYLENEIMINE OR DERIVATIVE

| Example | Acylating Agent | Ratio, Mols Acylating Agent Per Mol PE Deriv. | Mols or Water Removed Per Mole of Reactant | Physical Properties |
|---|---|---|---|---|
| 1-$K_2A$ | Lauric | 4:1 | 1 | Viscous liquid. |
| 2-$K_3A$ | Oleic | 1:1 | 1.5 | Do. |
| 3-$K_1A$ | Palmitic | 1:1 | 1 | Do. |
| 4-$K_4A$ | Dimeric | 0.5:1 | 1 | Solid. |
| 5-$K_1A$ | Nonanoic | 2:1 | 1 | Viscous liquid. |
| 5-$K_2A$ | Ricinoleic | 2:1 | 1.8 | Do. |
| 5-$K_3A$ | Succinic anhydride alkyl ($C_{12}$). | 2:1 | 1 | Do. |
| 5-$K_4A$ | Stearic | 1:1 | 1.5 | Solid. |
| 6-$K_3A$ | Myristic | 2:1 | 1 | Viscous liquid. |
| 2-$A_4KA$ | Acetic | 2:1 | 1 | Do. |
| 6-$A_4KA$ | Diglycolic | 1:1 | 1 | Do. |
| 2-$O_1KA$ | Lauric | 2:1 | 1 | Do. |
| 1-$O_2KA$ | Oleic | 2:1 | 1.3 | Do. |
| 1-$O_2HKA$ | Maleic anhydride | 1:1 | | Solid. |

The following table presents specific illustrations of compounds other than polyethyleneimine and its derivatives.

TABLE VII-A.—ACYLATED, PRIOR ALKYLATED POLYPROPYLENEIMINE OR DERIVATIVE

| Example | Acylating Agent | Ratio, Mols of Acylating Agent Per Mol of Polypropyleneimine Derivative | Mols of Water Removed Per Mol of Reactant | Physical Properties |
|---|---|---|---|---|
| 7-$K_2A$ | Myristic | 2:1 | 1 | Viscous liquid. |
| 8-$K_3A$ | Acetic | 2:1 | 1 | Do. |
| 9-$K_1A$ | Diglycolic | 1:1 | 1 | Do. |
| 10-$K_4A$ | Lauric | 2:1 | 1 | Do. |
| 11-$K_2A$ | Oleic | 2:1 | 1.3 | Do. |
| 12-$K_1A$ | Maleic anhydride | 1:1 | | Solid. |
| 16-$A_3KA$ | Lauric | 4:1 | 1 | Viscous liquid. |
| 20-$A_1KA$ | Oleic | 1:1 | 1.5 | Do. |
| 28-$O_2KA$ | Palmitic | 1:1 | 1 | Do. |
| 44-$O_5KA$ | Dimeric | 0.5:1 | 1 | Do. |
| 61-$O_2KA$ | Nonanoic | 2:1 | 1 | Do. |
| 15-$A_2O_4KA$ | Ricinoleic | 2:1 | 1.8 | Do. |
| 19-$A_3O_3KA$ | Alkyl succinic anhydride (C-12). | 2:1 | | Solid. |
| 44-$O_5AKA$ | Stearic | 1:1 | 1 | Viscous liquid. |
| 46-$O_3HKA$ | Myristic | 2:1 | 1 | Do. |
| 20-$A_1O_2HKA$ | Acetic | 1:1 | 1 | Do. |

The reaction is carried out in the conventional manner such as illustrated, for example, in "Synthetic Organic Chemistry," Wagner & Zook (Wiley, 1953), page 673.

Non-limiting examples of unsaturated compounds which can be reacted with the polyamine and derivatives thereof including the following—acrylonitrile, acrylic and methacrylic acids and esters crotonic acid and esters, cinnamic acid and esters, styrene, styrene derivatives and related compounds, butadiene, vinyl ethers, vinyl ketones, maleic esters, vinyl sulfones, etc.

In addition, polyethyleneimine and derivatives thereof containing active hydrogens can be used to prepare telomers of polymer prepared from vinyl monomers.

The following are examples of olefination. The symbol employed to designate olefination is "U" and alkylation, olefination "KU."

Example 1–$U_1$

The olefination reaction is carried out in the usual glass resin apparatus. Since the reaction is that of a double bond with an active hydrogen, no water is eliminated. The reaction is relatively simply, as shown by the following example:

Charge 900 grams of polyethyleneimine 900 in xylene (1 mol) into glass resin apparatus. Care should be taken that the PEI 900 is water-free, to eliminate undesirable side reactions. At room temperature, slowly add 53 grams of acrylonitrile (1 mol). The reaction proceeds smoothly without the aid of a catalyst. Warm gently to 80–100° C. and stir for one hour.

Example 6–$U_1$

To 1,000 grams of polyethylenimine 100,000 (0.01 mols) in 300 grams of xylene, add 1.24 grams of divinyl sulfone (0.01 mol) at room temperature. This reaction is exothermic and the ambient temperature is employed.

Example 2–$O_1KAU$

Same reactions as Example 1–U except that 1 mol of methylacrylate is substituted for acrylonitrile and 2–$O_1KA$ is substituted for the polyethyleneimine 900. Part of this product is thereupon saponified with sodium hydroxide to form the fatty amino acid salt.

Further examples of the reaction are summarized in the following table:

TABLE VIII.—OLEFINATION

| Example | Mol. Weight of Polyethyleneimine | Olefin | Mols of Olefin Per Mol PE | Time | Temp., ° C. |
|---|---|---|---|---|---|
| 1–$U_1$ | 900 | Acrylonitrile | 1:1 | 1 hr | 80–100 |
| 1–$U_2$ | 900 | Methylacrylate | 2:1 | 1 hr | 80–100 |
| 1–$U_3$ | 900 | Styrene | 3:1 | 2 hrs | 90 |
| 2–$U_1$ | 5,000 | Ethyl cinnamate | 2:1 | 3 hrs | 120 |
| 2–$U_2$ | 5,000 | Ethyl crotonate | 2:1 | 3 hrs | 125 |
| 2–$U_3$ | 5,000 | Dioctyl maleate | 2:1 | 2 hrs | 100 |
| 3–$U_1$ | 11,500 | Divinyl sulfone | 1:1 | 1 hr | 70 |
| 3–$U_2$ | 11,500 | Styrene | 1:1 | 30 mins | 90 |
| 3–$U_3$ | 11,500 | Lauryl methacrylate | 2:1 | 3 hrs | 135 |
| 4–$U_1$ | 20,000 | Divinyl sulfone | 1:1 | 1 hr | 80–100 |
| 4–$U_2$ | 20,000 | Methyl methacrylate | 1:1 | 1 hr | 80–100 |
| 4–$U_3$ | 20,000 | Acrylonitrile | 3:1 | 30 mins | 80–100 |
| 5–$U_1$ | 50,000 | Methylacrylate | 3:1 | 1 hr | 80–100 |
| 5–$U_2$ | 50,000 | Acrylonitrile | 3:1 | 1 hr | 80–100 |
| 5–$U_3$ | 50,000 | Styrene | 3:1 | 1 hr | 90 |
| 6–$U_1$ | 100,000 | Divinyl sulfone | 1:1 | 1 hr | 70 |
| 6–$U_2$ | 100,000 | Ethyl crotonate | 2:1 | 2 hrs | 125 |
| 6–$U_3$ | 100,000 | Diocytl maleate | 2:1 | 1 hr | 100 |

| Example | Olefin | Mols of Olefin Per Mol PE | Time | Temp., ° C. |
|---|---|---|---|---|
| 1–$A_6U$ | Styrene | 1:1 | 1 hr | 90 |
| 2–$A_4U$ | Divinyl sulfone | 1:1 | 1 hr | 70 |
| 3–$A_4U$ | Methylacrylate | 1:1 | 1 hr | 80–100 |
| 6–$A_4U$ | Divinyl sulfone | 1:1 | 1 hr | 70 |
| 8–$A_2U$ | Styrene | 3:1 | 2 hrs | 90 |
| 13–$A_1U$ | Dimethyl maleate | 1:1 | 1 hr | 100 |
| 1–$O_1U$ | Dioctyl maleate | 2:1 | 1 hr | 100 |
| 2–$O_1U$ | Ethyl crotonate | 2:1 | 2 hrs | 125 |
| 3–$O_1U$ | Divinyl sulfone | 1:1 | 1 hr | 70 |
| 4–$O_1U$ | Styrene | 4:1 | 1 hr | 90 |
| 19–$O_1U$ | Acrylonitrile | 3:1 | 1 hr | 80–100 |
| 20–$O_1U$ | Methylacrylate | 3:1 | 1 hr | 80–100 |
| 22–$O_5U$ | Acrylonitrile | 3:1 | 30 mins | 80–100 |
| 23–$O_1U$ | Methyl methacrylate | 1:1 | 1 hr | 80–100 |
| 24–$O_1U$ | Divinyl sulfone | 1:1 | 1 hr | 70 |
| 1–$A_5O_1U$ | Lauryl methacrylate | 2:1 | 3 hrs | 135 |
| 23–$O_2AU$ | Divinyl sulfone | 1:1 | 1 hr | 70 |
| 14–$O_1HU$ | Dioctyl maleate | 2:1 | 2 hrs | 100 |
| 4–$K_1U$ | Ethyl crotonate | 2:1 | 3 hrs | 125 |
| 4–$K_4AU$ | Ethyl cinnamate | 2:1 | 3 hrs | 120 |
| 2–$A_4KAU$ | Styrene | 3:1 | 2 hrs | 90 |
| 2–$O_1KAU$ | Methylacrylate | 2:1 | 1 hr | 80–100 |
| 1–$O_2HKAU$ | Acrylonitrile | 1:1 | 1 hr | 80–100 |

The following table presents specific illustration of compounds other than polyethyleneimine and its derivatives.

TABLE VIII-A.—OLEFINATION OF POLYPROPYLENEIMINE

| Example | Molecular Weight of Polypropyleneimine | Olefin | Mols of Olefin Per Mol of Polypropyleneimine | Time in Hours | Temp., °C. |
|---|---|---|---|---|---|
| 7-U₁ | 500 | Styrene | 1:1 | 1 | 90 |
| 7-U₂ | 500 | Divinyl sulfone | 1:1 | 1 | 70 |
| 7-U₃ | 500 | Acrylonitrile | 2:1 | 1 | 80-100 |
| 8-U₁ | 1,000 | Dioctyl maleate | 1:1 | 2 | 120 |
| 8-U₂ | 1,000 | Methylacrylate | 1:1 | 1 | 110 |
| 8-U₃ | 1,000 | Ethyl cinnamate | 3:1 | 2 | 125 |
| 9-U₁ | 5,000 | Lauryl methacrylate | 1:1 | 3 | 130 |
| 9-U₂ | 5,000 | Ethyl crotonate | 1:1 | 3 | 120 |
| 9-U₃ | 5,000 | Acrylonitrile | 4:1 | 1 | 80-100 |
| 10-U₁ | 10,000 | Styrene | 2:1 | 1 | 90 |
| 10-U₂ | 10,000 | Divinyl sulfone | 1:1 | 1 | 80 |
| 10-U₃ | 10,000 | Methylacrylate | 2:1 | 1 | 100 |
| 11-U₁ | 20,000 | Lauryl methacrylate | 1:1 | 3 | 110 |
| 11-U₂ | 20,000 | Styrene | 2:1 | 1 | 90 |
| 11-U₃ | 20,000 | Divinyl sulfone | 1:1 | 1 | 80 |
| 12-U₁ | 40,000 | Methyl acrylate | 2:1 | 2 | 120 |
| 12-U₂ | 40,000 | Acrylonitrile | 3:1 | 1 | 80 |
| 12-U₃ | 40,000 | Dioctyl maleate | 1:1 | 4 | 110 |

CARBONYLATION

Carbonylation relates to the reaction of polyethyleneimine and derivatives thereof with aldehydes and ketones.

Where primary amino groups are present on the polyethyleneimine reactants, Schiff's bases can be formed on reaction with carbonyl compounds. For example, where an aldehyde such as salicylaldehyde is reacted with polyethyleneimine 900 in a ratio of 2 moles of aldehyde to 1 mole of PE 900, the following type of compound could be formed:

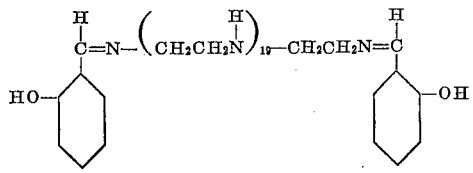

Lesser molar ratios of aldehyde to polyamine would yield mono-Schiff's base such as

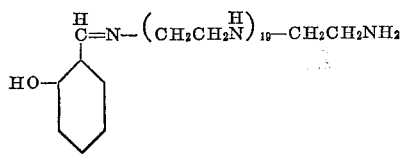

etc., and other isomeric configurations, such as where the Schiff's base is present on the non-terminal amino group rather than on the terminal amino group, etc.

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following:

Aldehydes:
Benzaldehyde
2-methylbenzaldehyde
3-methylbenzaldehyde
4-methylbenzaldehyde
4-methylbenzaldehyde
2-methoxybenzaldehyde
4-methoxybenzaldehyde
α-Naphthaldehyde
β-Naphthaldehyde
4-phenylbenzaldehyde
Propionaldehyde
n-Butyraldehyde
Heptaldehyde
Aldol
2-hydroxybenzaldehyde
2-hydroxy-6-methylbenzaldehyde
2-hydroxy-3-methoxybenzaldehyde
2-4-dihydroxybenzaldehyde
2-6-dihydroxybenzaldehyde
2-hydroxynaphthaldehyde-1
1-hydroxynaphthaldehyde-2
Anthrol-2-aldehyde-1
2-hydroxyfluorene-aldehyde-1
4-hydroxydiphenyl-aldehyde-3
3-hydroxyphenanthrene-aldehyde-4
1-3-dihydroxy-2-4-dialdehydebenzene
2-hydroxy-5-chlorobenzaldehyde
2-hydroxy-5-chlorobenzaldehyde
2-hydroxy-3,5-dibromobenzaldehyde
2-hydroxy-3-nitrobenzaldehyde
2-hydroxy-3-cyanobenzaldehyde
2-hydroxy-3-carboxybenzaldehyde
4-hydroxypyridine-aldehyde-3
4-hydroxyquinoline-aldehyde-3
7-hydroxyquinoline-aldehyde-8
Formaldehyde
Glyoxal
Glyceraldehyde Schiff's bases are prepared with the polyethyleneimines of this invention in a conventional manner such as described in "Synthetic Organic Chemistry" by Wagner & Zook (1953, Wiley), pages 728–9.

Where more extreme conditions are employed, the products may be more complex wherein the carbonyl reactant instead of reacting intramolecularly in the case of a Schiff's base may react intermolecularly so as to act as a bridging means between two or more polyethyleneimine compounds, thus increasing the molecular weight of the polyethyleneimine as schematically seen below in the case where formaldehyde is the carbonyl compound:

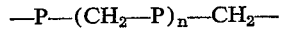

In addition to increasing the molecular weight by means of aldehydes, these compounds result in the formation of cyclic compounds. Probably both molecular weight increase and cyclization occur during the reaction.

The following examples illustrate the reaction of carbonyl compounds with polyethyleneimines. The symbol employed to designate carbonylation is "C," acylation, carbonylation "AC," and alkylation, carbonylation "KC."

Example 1-$C_1$

Charge 900 grams of polyethyleneimine 900 and 900 grams of xylene into a conventional glass resin apparatus fitted with a stirrer, thermometer and side-arm trap. Raise temperature to 90° C. and slowly add 44 grams of acetaldehyde (1 mol). Hold at this temperature for three hours. Vacuum is then applied until all xylene is stripped off. The reaction mass is a thick dark liquid which is soluble in water.

Example 5-$C_1$

Using the same apparatus as above, charge 500 g. (0.1) of polyethyleneimine 5,000. While stirring, add slowly at room temperature 8.2 grams of 37% aqueous formaldehyde (0.1 mol of HCHO). After the reaction has ceased, raise temperature to 100° C. The reaction mass may be stopped at this point. It is a viscous water-soluble material. However, it is possible to continue heating under vacuum until all of the water has been eliminated. Cross-linking occurs with this procedure and care must be taken to prevent insolubilization.

Further examples of this reaction are summarized in the following table:

TABLE IX.—CARBONYLATION

| Example | Mol Weight of Polyethyleneimine | Aldehyde | Mol Ratio Aldehyde to Polyethyleneimine or Deriv. | Temp., ° C. | Time |
|---|---|---|---|---|---|
| 1-$C_1$ | 900 | Acetaldehyde | 1:1 | 90 | 3 hours. |
| 1-$C_2$ | 900 | do | 2:1 | 90 | Do. |
| 1-$C_3$ | 900 | do | 3:1 | 90 | Do. |
| 2-$C_1$ | 5,000 | Heptaldehyde | 5:1 | 125 | 4 hours. |
| 2-$C_2$ | 5,000 | do | 3:1 | 125 | Do. |
| 2-$C_3$ | 5,000 | do | 1:1 | 125 | Do. |
| 3-$C_1$ | 11,500 | Glyoxal | 2:1 | 80 | 1 hour. |
| 3-$C_2$ | 11,500 | do | 1:1 | 80 | Do. |
| 3-$C_3$ | 11,500 | do | 0.5:1 | 80 | Do. |
| 4-$C_1$ | 20,000 | Salicylaldehyde | 6:1 | 140 | 3 hours. |
| 4-$C_2$ | 20,000 | do | 5:1 | 140 | Do. |
| 4-$C_3$ | 20,000 | do | 3:1 | 140 | Do. |
| 5-$C_1$ | 50,000 | Formaldehyde | 3:1 | (1) | 1 hour. |
| 5-$C_2$ | 50,000 | do | 2:1 | (1) | Do. |
| 5-$C_3$ | 5,000 | do | 2:1 | (1) | Do. |
| 6-$C_1$ | 100,000 | Glyceraldehyde | 6:1 | 125 | 5 hours. |
| 6-$C_2$ | 100,000 | do | 3:1 | 125 | Do. |
| 6-$C_3$ | 100,000 | do | 2:1 | 125 | Do. |
| 1-$A_7C$ | 100,000 | Salicylaldehyde | 3:1 | 120 | 2 hours. |
| 2-$A_4C$ | 100,000 | do | 2:1 | 120 | Do. |
| 4-$A_3C$ | 100,000 | do | 1:1 | 120 | Do. |
| 6-$A_4C$ | 100,000 | Benzaldehyde | 3:1 | 110 | 1 hour. |
| 8-$A_3C$ | 100,000 | do | 2:1 | 110 | Do. |

| Example | Aldehyde | Mol Ratio Aldehyde to Polyethyleneimine | Temp., ° C. | Time |
|---|---|---|---|---|
| 1-$O_1C$ | Benzaldehyde | 1:1 | 110 | 1 hour. |
| 2-$O_1C$ | Glyoxal | 3:1 | 100 | 2 hours. |
| 3-$O_1C$ | do | 2:1 | 100 | Do. |
| 19-$O_1C$ | do | 1:1 | 100 | Do. |
| 20-$O_1C$ | Formaldehyde | 3:1 | (2) | 1 hour. |
| 22-$O_5C$ | do | 2:1 | (2) | Do. |
| 1-$A_5O_1C$ | do | 1:1 | (2) | Do. |
| 1-$A_5O_6C$ | Glyceraldehyde | 3:1 | 130 | 4 hours. |
| 6-$A_4OC$ | do | 2:1 | 130 | Do. |
| 12-$O_2AC$ | Furfuraldehyde | 3:1 | 100 | 1 hour. |
| 17-$O_3AC$ | do | 2:1 | 100 | Do. |
| 26-$O_1AC$ | do | 1:1 | 100 | Do. |
| 1-$O_2HC$ | Heptaldehyde | 3:1 | 140 | 6 hours. |
| 1-$K_1C$ | do | 2:1 | 140 | Do. |
| 5-$K_2AC$ | do | 1:1 | 140 | Do. |
| 1-$K_2AC$ | Formaldehyde | 3:1 | (2) | 1 hour. |
| 5-$U_1C$ | do | 2:1 | (2) | Do. |
| 3-$O_1UC$ | do | 1:1 | (2) | Do. |

[1] Start at 25° C. Raise to 100° C.
[2] Start at 25° C. Raise to 90° C.

The following table presents specific illustration of compounds other than polyethyleneimine and its derivatives.

TABLE IX-A.—CARBONYLATION

| Example | Molecular Weight of Polypropylenemine | Aldehyde | Mol Ratio Aldehyde to Polypropylenemine | Temp., ° C. | Time in Hours |
|---|---|---|---|---|---|
| 7-$C_1$ | 500 | Benzaldehyde | 1:1 | 110 | 1 hour. |
| 7-$C_2$ | 500 | do | 2:1 | 110 | Do. |
| 7-$C_3$ | 500 | do | 3:1 | 110 | Do. |
| 8-$C_1$ | 1,000 | Salicylaldehyde | 4:1 | 120 | Do. |
| 8-$C_2$ | 1,000 | do | 3:1 | 120 | Do. |
| 8-$C_3$ | 1,000 | do | 2:1 | 120 | Do. |
| 9-$C_1$ | 5,000 | Formaldehyde | 2:1 | 90 | Do. |
| 9-$C_2$ | 5,000 | do | 1:1 | 90 | Do. |
| 9-$C_3$ | 5,000 | do | 0.5:1 | 90 | Do. |
| 10-$C_1$ | 10,000 | Glyoxal | 2:1 | 90 | Do. |
| 10-$C_2$ | 10,000 | do | 1:1 | 90 | Do. |
| 10-$C_3$ | 10,000 | do | 0.5:1 | 90 | Do. |
| 11-$C_1$ | 20,000 | Acetaldehyde | 3:1 | 100 | 2 hours. |
| 11-$C_2$ | 20,000 | do | 2:1 | 100 | Do. |
| 11-$C_3$ | 20,000 | do | 1:1 | 100 | Do. |
| 12-$C_1$ | 40,000 | Heptaldehyde | 4:1 | 130 | 3 hours. |
| 12-$C_2$ | 40,000 | do | 3:1 | 130 | Do. |
| 12-$C_3$ | 40,000 | do | 2:1 | 130 | Do. |

TABLE IX–A.—Continued

| Example | Aldehyde | Mol Ratio of Aldehyde to Polypropyleneimine or Derivative | Temp., °C. | Time in Hours |
|---|---|---|---|---|
| 15-A$_3$C | Glyceraldehyde | 3:1 | 125 | 4 |
| 18-A$_3$C | Heptaldehyde | 2:1 | 125 | 4 |
| 20-A$_2$C | Furfuraldehyde | 1:1 | 100 | 2 |
| 27-O$_1$C | Glyoxal | 1:1 | 90 | 1 |
| 28-O$_2$C | Benzaldehyde | 4:1 | 120 | 2 |
| 29-O$_3$C | Formaldehyde | 1:1 | (¹) | 1 |
| 43-O$_2$C | Acetaldehyde | 1:1 | 100 | 2 |
| 15-A$_3$O$_2$C | ...do | 2:1 | 100 | 2 |
| 20-A$_1$O$_2$C | ...do | 3:1 | 100 | 2 |
| 32-O$_4$AC | Salicylaldehyde | 1:1 | 130 | 3 |
| 51-O$_4$AC | ...do | 2:1 | 130 | 3 |
| 32-O$_1$HC | ...do | 3:1 | 130 | 3 |
| 15-A$_2$O$_1$HC | Benzaldehyde | 3:1 | 125 | 2 |
| 8-K$_4$C | ...do | 2:1 | 125 | 2 |
| 12-K$_2$C | ...do | 1:1 | 125 | 2 |
| 10-K$_4$AC | Glyoxal | 2:1 | 100 | 1 |
| 61-O$_2$KAC | ...do | 1:1 | 100 | 1 |
| 20-A$_1$O$_2$KAC | ...do | 0.5:1 | 100 | 1 |
| 7-U$_2$C | Formaldehyde | 2:1 | 70 | 1 |
| 12-U$_3$C | ...do | 1:1 | 70 | 1 |

The examples presented above are non-limiting examples. It should be clearly understood that various other combinations, order of reactions, reaction ratios, multiplicity of additions, etc., can be employed. Where additional reactive groups are still present on the molecule, the reaction can be repeated with either the original reactant or another reactant.

The type of compound prepared is evident from the letters assigned to the examples. Thus, taking the branched polyamine as the starting material, the following example designations have the following meaning:

| Example | Designation | Meaning |
|---|---|---|
| (1) | A | Acylated. |
| (2) | AO | Acylated, then oxyalkylated. |
| (3) | AOA | Acylated, then oxyalkylated then acrylated. |
| (4) | AOH | Acylated, then oxyalkylated, then heat treated. |
| (5) | AX | Salt or quaternary of (1). |
| (6) | AOX | Salt or quaternary of (2). |
| (7) | AOAX | Salt or quaternary of (3). |
| (8) | AOHX | Salt or quaternary of (4). |
| (9) | O | Oxyalkylated. |
| (10) | OA | Oxyalkylated, then acylated. |
| (11) | OH | Oxyalkylated, then heat treated. |
| (12) | K | Alkylated. |
| (13) | KX | Salt or quaternary of (12). |
| (14) | KA | Alkylated, then acylated. |
| (15) | AK | Acylated, then alkylated. |
| (16) | AKX | Salt or quaternary of (15). |
| (17) | OK | Oxyalkylated, then alkylated. |
| (18) | OKX | Salt or quaternary of (17). |
| (19) | C | Carbonylated. |
| (20) | AC | Acylated, then carbonylated. |
| (21) | KC | Alkylated, then carbonylated. |
| (22) | CO | Carbonylated, then oxyalkylated. |
| (23) | U | Olefinated. |
| (24) | AU | Acylated, then olefinated. |
| (25) | KU | Alkylated, then olefinated. |
| (26) | KUX | Salt or quaternary of (25). |

In addition to polyethyleneimine itself, other polyalkyleneimines can be employed, a typical example of which is polypropyleneimines. Propyleneimine is now commercially available and can be polymerized to the polymer and polypropyleneimine can then be reacted in a manner similar to those reactions shown above. Thus, the teachings contained herein also apply to other polyalkyleneimines besides polyethyleneimine and derivatives thereof.

CORROSION INHIBITORS

This phase of our invention relates to the use of our compositions in preventing the corrosion of metals and particularly iron, steel and ferrous alloys. These compositions can be used in a wide variety of applications and systems where iron, steel and ferrous alloys are affected by corrosion. They may be employed for inhibiting corrosion in processes which require thin protective or passivating coatings as by dissolution in the medium which comes in contact with the metal. They can be used in preventing atmospheric corrosion, underwater corrosion, corrosion in closed systems, corrosion in steam and hot water systems, corrosion in chemical industries, underground corrosion, etc.

These corrosion inhibitors find special utility in the prevention of corrosion of pipe or equipment which is in contact with a corrosive oil-containing medium, as, for example, in oil wells producing corrosive oil or oil-brine mixtures, in refineries, and the like. They appear to possess properties which impart to metals resistance to attack by a variety of corrosive agents, such as brines, weak inorganic acids, organic acids, $CO_2$, $H_2S$, etc.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conveniently fed into the well annulus by means of a motor driven chemical injector pump, or it may be dumped periodically (e.g., once every day or two) into the annulus by means of a so-called "boll weevil" device or similar arrangement. Where the inhibitor is fabricated in solid form (as hereinafter described), it may be dropped into the well as a solid lump or stick, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. The results, for example, when the tubing is surrounding at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid weighted or unweighted "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently. Methods of preparing and using these types of sticks are described in U.S. Patents 2,559,384 and 2,559,385.

The amount of corrosion preventive agent required in our process varies with the corrosiveness of the system, but where a continous or semi-continuous treating procedure is carried out as described above, the addition of reagent in the proportion of from 5 parts to 1,000 parts per million or more parts of corrosive fluid, but preferably from 10 to 100 p.p.m., will generally provide protection.

The protective action of the herein described reagents appears to be maintained for an appreciable time after treatment ceases, but eventually is lost unless another application is made.

For the protection of gas wells and gas-condensate wells, the amount of corrosion inhibitor required will usually be within the range of one-half to 3 lbs. or more per million cubic feet of gas produced, depending upon the amount and type of corrosive agent in the gas and the amount of liquid hydrocarbon and water produced. However, in no case does the amount of inhibitor required appear to be stoichiometrically related to the amount of acids produced by a well, since protection is obtained with much less of the compounds than usually would be required for neutralization of the acids produced.

The compounds of this invention can also be employed in conjunction with other corrosive inhibitors, for example, those disclosed in Reissue 22,963, etc.

The following examples are presented to illustrate the superiority of the instant compounds as corrosive inhibitors.

EXAMPLES

Stirring test

These tests are run on synthetic fluids. The procedure involves the comparison of the amount of iron in solution after a predetermined interval of time of contact of a standardized iron surface with a two-phase corrosive medium with similar determinations in systems containing inhibitors.

Six hundred ml. beakers equipped with stirrers and heaters are charged with 400 ml. of 10% sodium chloride containing 500 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and uninhibited samples run simultaneously. Percent protection can be determined by the following formula:

$$\frac{A_1 - A_2}{A_1} \times 100 = \text{Percent protection}$$

where $A_1$ is the percent light absorbed by an uninhibited sample and $A_2$ is the same value for inhibited sample.

When tested according to the above procedure, the following compounds employed in 50–100 p.p.m. give 80–95% protection.

CORROSION INHIBITORS

| | |
|---|---|
| Polyethyleneimine, molecular weight | 900 |
| Polyethyleneimine, molecular weight | 5,000 |
| Polyethyleneimine, molecular weight | 11,500 |
| Polyethyleneimine, molecular weight | 20,000 |
| Polyethyleneimine, molecular weight | 50,000 |
| Polyethyleneimine, molecular weight | 100,000 |

| | |
|---|---|
| 1–$A_5$ | 9–$A_2O$ |
| 2–$A_1$ | 11–$A_3O_2$ |
| 3–$A_3$ | 1–$O_1A_1$ |
| 4–$A_1$ | 4–$O_2A$ |
| 5–$A_2$ | 19–$O_1A$ |
| 8–$A_1$ | 25–$O_3A_2$ |
| 10–$A_1$ | 15–$O_6H$ |
| 12–$A_1$ | 25–$O_2H$ |
| 12–$A_2$ | 1–$K_4$ |
| 1–$O_5$ | 2–$K_4$ |
| 2–$O_4$ | 3–$K_3$ |
| 3–$O_3$ | 4–$K_1$ |
| 7–O | 5–$K_1$ |
| 8–O | 6–$K_4$ |
| 12–$O_3$ | 25–$O_2HK$ |
| 16–$O_5$ | 6–$K_4X$ |
| 19–$O_4$ | 16–$O_4KX$ |
| 22–$O_6$ | 5–$K_3A$ |
| 1–$A_5O_5$ | 6–$A_4KA$ |
| 2–$A_4O$ | 5–$U_2$ |

CORROSION INHIBITORS

| | |
|---|---|
| Polypropyleneimine, molecular weight | 500 |
| Polypropyleneimine, molecular weight | 1,000 |
| Polypropyleneimine, molecular weight | 5,000 |
| Polypropyleneimine, molecular weight | 10,000 |
| Polypropyleneimine, molecular weight | 20,000 |
| Polypropyleneimine, molecular weight | 40,000 |

| | |
|---|---|
| 15–$A_2$ | 56–$O_4H$ |
| 17–$A_3$ | 20–$A_1O_3H$ |
| 19–$A_3$ | 7–$K_2$ |
| 20–$A_2$ | 10–$K_1$ |
| 43–$O_1$ | 12–$K_1$ |
| 44–$O_1$ | 50–$O_2K$ |
| 46–$O_1$ | 46–$O_3HK$ |
| 47–O | 11–$K_2A$ |
| 61–$O_1$ | 15–$A_2O_4KA$ |
| 15–$A_2O_3$ | 11–$U_1$ |
| 19–$A_3O_1$ | 12–$C_2$ |
| 31–$O_2A$ | 15–$A_3C$ |

USE IN SLUSHING OILS

These corrosion inhibitors also find special utility in the prevention of corrosion or rusting of metals when applied thereto in the form of a coating, for example, as slushing oils.

In the shipping and storage of metal articles, particularly ferrous metal articles having machined surfaces, it is highly desirable to protect such articles from the corrosion and rusting which normally occur when metal surfaces are exposed to the atmosphere for any length of time. While such protection should remain effective over long periods of time under very adverse conditions of humidity, it should likewise be of such nature that it can readily be removed when it is desired to place the metal article into use. Among the various means employed for providing such protection against corrosion, that of applying a film or coating of a corrosion inhibiting liquid composition to the metal surface has enjoyed widest use by reason of its economy and adaptability to all sorts of metal articles ranging from simple pieces to complicated machine assemblies. Such liquid corrosion preventive compositions often comprise a mineral or other non-drying oil base having a corrosion preventive material dispersed or dissolved therein, and are hence usually referred to generically as "slushing oils" even though in some instances they may not actually contain an oil.

The slushing oils heretofore employed, however, have been subject to numerous disadvantages. In some instances they have been too expensive for widespread general use whereas in others they are too difficult to remove from surfaces to which they have been applied. Many of them have not proved effective over sufficiently long periods of time, or have not provided the desired degree of protection against corrosion under extreme climatic conditions such as those encountered in the tropics or at sea.

The compositions of this invention are capable of use in inhibiting or preventing the corrosion or rusting of metal surfaces over long periods of time and under adverse climatic conditions. They can readily be dissolved or dispersed in a suitable liquid vehicle to form inexpensive and highly effective slushing oil compositions.

While the above-described products can be employed per se in inhibiting or preventing the corrosion or rusting of metals, by reason of their high viscosity they are more readily applied to metal surfaces in the form of a solution or dispersion in a liquid vehicle. For example, they are dissolved in a heavy organic solvent where one does not desire it to evaporate, or in a relatively light organic solvent, such as hexane, benzene, petroleum ether, carbon tetrachloride, or a light naphtha, etc., to form slushing oil compositions of a viscosity suitable for application to metal surfaces by dipping, brushing, or spraying procedures. The heavy solvent will remain with the compositions of this invention, but the light solvent will evaporate leaving a thin protective coating of the corrosion inhibiting products on the metal surface. When it is desired to use the metal article thus protected, the corrosion preventive coating may readily be removed by washing with a suitable solvent. Gasoline is an excellent solvent for this purpose since it is cheap and universally available. The light petroleum distillate known as Stoddard solvent has been found particularly suitable for use as the solvent in preparing liquid protective coating compositions comprising the new corrosion preventives, and may also be used in the subsequent removal of the protective coating.

In addition to being employed per se or in the form of the above-described liquid coating compositions, the corrosion preventive reaction products of the present invention may advantageously be employed in conjunction with other corrosion inhibitors.

The amount of active compound in the solvent will depend upon the nature of the solvent itself as well as the thickness of the coating desired on the metal surface, for example, from 0.5 to 100% by weight based on the weight of the solvent, but preferably 1–25%. Where the solvent is not appreciably volatile lesser amounts can be employed for example, 0.5–10%, but preferably 1–5%. Where the solvent is volatile more of the active compound is employed, for example, 5–100%, but preferably 25–75%.

Among the solvents which can be used are normally liquid petroleum hydrocarbons, such as normal hexane, 2,2,4-trimethyl pentane, 2,2,5,3-tetramethylbutane, 2,5-dimethylhexane, normal octane, nonane, decane, dodecane, ethyl cyclohexane, isopropylcyclohexane, toluene, p-xylene, o-xylene, m-xylene, cumene, petroleum naphtha, mineral spirits which are distillates obtained from petroleum having a boiling range of between about 150°–216° C. and a flash point of 100° C., kerosene, Stoddard solvent, mineral seal oil, gas oil, gasoline, other light petroleum distillates, turpentine, petrolatum halogenated hydrocarbons such as ethylene dichloride, trichloroethylene, propyl chloride, butyl chloride, chlorinated kerosene, alcohols such as methyl ethyl, propyl, isopropyl, butyl, amyl, hexyl, cyclohexyl, heptyl, methyl, cyclohexyl, octyl, decyl, lauryl, myristyl, cetyl, stearyl, benzyl, etc., alcohols, polyhydric alcohols, such as glycols, glycerols, etc., esters of monohydric alcohols, etc.

The following examples are presented to illustrate our present invention.

EXAMPLES

Test pieces of iron plaques are coated with a composition containing 0.1% by weight of the composition shown in the following table in mineral oil.

Uncoated iron plaques are used as controls. The iron plaques are kept at a temperature of about 90° C. in a humidity box.

In contrast to the control on which intensive rust occurred, little if any rusting is observed on the coated plaques.

COMPOUNDS USED IN SLUSHING OILS

| | |
|---|---|
| 1–$A_5$ | 5–$U_2$ |
| 4–$A_1$ | 5–$C_3$ |
| 6–$A_2$ | 17–$A_1$ |
| 7–$A_3$ | 20–$A_2$ |
| 12–$A_2$ | 29–$O_5$ |
| 1–$O_1$ | 32–$O_3$ |
| 2–$O_6$ | 41–O |
| 3–$O_4$ | 50–$O_4$ |
| 6–$O_4$ | 51–$O_4$ |
| 17–$O_2$ | 15–$A_2O_4$ |
| 22–$O_6$ | 19–$A_3O_3$ |
| 1–$A_5O_4$ | 48–$O_3A$ |
| 4–$O_2A$ | 56–$O_4H$ |
| 12–$O_3H$ | 11–$K_2$ |
| 4–$K_2$ | 44–$O_5AK$ |
| 14–$O_1K$ | 61–$O_2KA$ |
| 11–$O_1HK$ | 11–$U_2$ |
| 5–$K_2X$ | 10–$C_3$ |
| 1–$O_2KA$ | 61–$O_2KAC$ |
| 1–$O_2HKA$ | |

Having thus described our invention, what we claim as new and desire to obtain by Letters Patent:

1. A process for preventing the corrosion of ferrous metals in contact with a corrosive system characterized by subjecting the exposed surfaces of said ferrous metals to the action of an amount of a compound varying directly with the corrosiveness of said corrosive system, said compound being a compound selected from the group consisting of
   (1) a linear polymer of a 1,2-alkyleneimine, said polymer having a molecular weight of at least 800, each alkylene unit having 2 to 20 carbon atoms,
   (2) an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent selected from the group consisting of
      (i) a carboxylic acid having 7–39 carbon atoms and
      (ii) a precursor of said carboxylic acid capable of forming said acid in said reaction,
   (3) an oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having at least two carbon atoms, (4) an alkylated linear polymer of a 1,2-alkyleneimine, said polymer having a molecular weight of at least 800, each alkylene unit having 2 to 20 carbon atoms, formed by reacting, at a temperature of from about 100° C to about 250° C., said polymer with a hydrocarbon halide alkylating agent having 1-30 carbon atoms, (5) an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones, (6) a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones, (7) an acylated, then oxyalkylated linear polymer of a 1,2-alkyleneimine, said polymer having a molecular weight of at least 800, each alkylene unit therein having 2-20 carbon atoms, formed by reacting at a temperature of from about 125° C. to about 300° C., said linear polymer with an acylating agent selected from the group consisting of (i) a carboxylic acid having 7-39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having at least 2 carbon atoms, (8) an oxyalkylated, then acylated linear polymer of a 1,2-alkyleneimine, said polymer having a molecular weight of at least 800, said alkylene unit therein having 2-20 carbon atoms, formed by reacting at a temperature of from about 80° C. to about 200° C. and a pressure of from about 10 p.s.i. to about 200 p.s.i., said polymer with an alkylene oxide having at least 2 carbon atoms and then reacting said oxyalkylated polymer, at a temperature of from about 120° C. to about 300° C., with an acylating agent selected from the group consisting of (i) a carboxylic acid having 7-39 carbon atoms and (ii) a precursor of said carboxylic acid capable of forming said acid in said reaction, (9) an alkylated, then acylated linear polymer of a 1,2-alkyleneimine, said polymer having a molecular weight of at least 800, each alkylene unit therein having 2-20 carbon atoms, formed by reacting at a temperature of from about 100° C. to about 250° C., said polymer with a hydrocarbon halide alkylating agent having 1-30 carbon atoms, and then reacting said alkylated polymer, at a temperature of from about 120° C. to about 300° C., with an acylating agent selected from the group consisting of (i) a carboxylic acid having 7-39 carbon atoms and (ii) a precursor of said carboxylic acid capable of forming said acid in said reaction,

(10) an acylated, then alkylated linear polymer of a 1,2-alkyleneimine, said polymer having a molecular weight of at least 800, each alkylene unit therein having 2-20 carbon atoms, formed by reacting at a temperature of from about 120° C. to about 300° C., said polymer with an acylating agent selected from the group consisting of (i) a carboxylic acid having 7-39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1-30 carbon atoms,

(11) an oxyalkylated, then alkylated linear polymer of a 1,2-alkyleneimine, said polymer having a molecular weight of at least 800, each alkylene unit therein having 2-20 carbon atoms, formed by reacting at a temperature of from about 80° C. to about 220° C. and a pressure of from about 10 p.s.i. to about 200 p.s.i., said polymer with an alkylene oxide having at least 2 carbon atoms, and then reacting said oxyalkylated polymer, at a temperature of from about 100° C. to about 250° C., with a hydrocarbon halide alkylating agent having 1-30 carbon atoms,

(12) a Schiff base reaction product of an acylated linear polymer of a 1,2-alkyleneimine, said polymer having a molecular weight of at least 800, each alkylene unit therein having 2-20 carbon atoms, formed by reacting, at a temperature of from about 120° C. to about 300° C., said polymer with an acylating agent selected from the group consisting of (i) a carboxylic acid having 7-39 carbon atoms and (ii) a precursor of said carboxylic acid capable of forming said acid in said reaction, and then reacting said acylated polymer with a compound selected from the group consisting of aldehydes and ketones,

(13) a Schiff base reaction product of an alkylated linear polymer of a 1,2-alkyleneimine, said polymer having a molecular weight of at least 800, each alkylene unit therein having 2-20 carbon atoms, formed by reacting, at a temperature of from about 100° C. to about 250° C., said polymer with a hydrocarbon halide alkylating agent having 1-30 carbon atoms, and then reacting said alkylated polymer with a compound selected from the group consisting of aldehydes and ketones,

(14) an oxyalkylated Schiff base reaction product of a linear polymer of a 1,2-alkyleneimine, said linear polymer having a molecular weight of at least 800, each alkylene unit therein having 2-20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i. to about 200 p.s.i., with an alkylene oxide having at least 2 carbon atoms,

(15) an acylated, then olefinated linear polymer of a 1,2-alkyleneimine, said polymer having a molecular weight of at least 800, each alkylene unit therein having 2-20 carbon atoms, formed by reacting, at a temperature of from about 120° C. to about 300° C., said linear polymer with an acylating agent selected from the group consisting of (i) a carboxylic acid having 7-39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and

(16) an alkylated, then olefinated linear polymer of a 1,2-alkyleneimine, said polymer having a molecular weight of at least 800, each alkylene unit therein having 2-20 carbon atoms, formed by reacting, at a temperature of from about 100° C. to about 250° C., said polymer with a hydrocarbon halide alkylating agent having from 1-30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

2. The process of claim 1 wherein said linear polymer of a 1,2-alkyleneimine is polyethyleneimine.

3. The process of claim 1 wherein said linear polymer of a 1,2-alkyleneimine is polypropyleneimine.

4. A process for preventing the corrosion of metals to be exposed to a corrosive medium characterized by applying to the exposed surfaces of said metals a coating of a slushing oil containing an amount of a compound sufficient to prevent corrosion of said metals when exposed to said corrosive medium, said compound being a compound selected from the group consisting of (1) a linear polymer of a 1,2-alkyleneimine, said polymer having a molecular weight of at least 800, each alkylene unit having 2 to 20 carbon atoms, (2) an acylated linear polymer of a 1,2-alkyleneimine, said polymer having a molecular weight of at least 800, each alkylene unit having 2 to 20 carbon atoms, formed by reacting, at a temperature of from about 120° C. to about 300° C., said linear polymer with an acylating agent selected from the group consisting of
  (i) a carboxylic acid having 7–39 carbon atoms and
  (ii) a precursor of said carboxylic acid capable of forming said acid in said reaction, (3) an oxyalkylated linear polymer of a 1,2-alkyleneimine, said polymer having a molecular weight of at least 800, each alkylene unit having 2 to 20 carbon atoms, formed by reacting, at a temperature of from about 80° C. to about 200° C. and a pressure of from about 10 p.s.i. to about 200 p.s.i., said polymer with an alkylene oxide having at least two carbon atoms, (4) an alkylated linear polymer of a 1,2-alkyleneimine, said polymer having a molecular weight of at least 800, each alkylene unit having 2 to 20 carbon atoms, formed by reacting, at a temperature of from about 100° C. to about 250° C., said polymer with a hydrocarbon halide alkylating agent having 1–30 carbon atoms, (5) an olefinated linear polymer of a 1,2-alkyleneimine, said polymer having a molecular weight of at least 800, each alkylene unit having 2 to 20 carbon atoms, formed by reacting, at a temperature of from about 70° C. to about 100° C., said polymer with an olefinating agent selected from the group consisting of acrylonitrile, styrene, butadiene, vinyl ethers, and vinyl sulfones, (6) a Schiff base reaction product of a linear polymer of a 1,2-alkyleneimine, said polymer having a molecular weight of at least 800, each alkylene unit having 2 to 20 carbon atoms, formed by reacting said polymer with a compound selected from the group consisting of aldehydes and ketones, (7) an acylate, then oxyalkylated linear polymer of a 1,2-alkyleneimine, said polymer having a molecular weight of at least 800, each alkylene unit therein having 2–20 carbon atoms, formed by reacting, at a temperature of from about 125° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 80° C. to about 200° C. and a pressure of from about 10 p.s.i. to about 200 p.s.i., with an alkylene oxide having at least 2 carbon atoms, (8) an oxyalkylated, then acylated linear polymer of a 1,2-alkyleneimine, said polymer having a molecular weight of at least 800, said alkylene unit therein having 2–20 carbon atoms, formed by reacting, at a temperature of from about 80° C. to about 200° C. and a pressure of from about 10 p.s.i. to about 200 p.s.i., said polymer with an alkylene oxide having at least 2 carbon atoms and then reacting said oxyalkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction, (9) an alkylated, then acylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer having a hydrocarbon halide alkylating agent having 1–30 carbon atoms, and then reacting said alkylated polymer, at a temperature of from about 120° C. to about 300° C., with an acylating agent selected from the group consisting of (i) a carboxylic acid having 7–39 carbon atoms and (ii) a precursor of said carboxylic acid capable of forming said acid in said reaction,

(10) an acylated, then alkylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 100° C. to about 250° C., with a hydrocarbon halide alkylating agent having 1–30 carbon atoms,

(11) an oxyalkylated, then alkylated linear polymer of a 1,2-alkyleneimine, said polymer having a molecular weight of at least 800, each alkylene unit therein having 2–20 carbon atoms, formed by reacting, at a temperature of from about 80° C. to about 220° C. and a pressure of from about 10 p.s.i. to about 200 p.s.i., said polymer with an alkylene oxide having at least 2 carbon atoms, and then reacting said oxyalkylated polymer, at a temperature of from about 100° C. to about 250° C., with a hydrocarbon halide alkylating agent having 1–30 carbon atoms,

(12) a Schiff base reaction product of an acylated linear polymer of a 1,2-alkyleneimine, said polymer having a molecular weight of at least 800, each alkylene unit therein having 2–20 carbon atoms, formed by reacting, at a temperature of from about 120° C. to about 300° C., said polymer with an acylating agent selected from the group consisting of (i) a carboxylic acid having 7–39 carbon atoms and (ii) a precursor of said carboxylic acid capable of forming said acid in said reaction, and then reacting said acylated polymer with a compound selected from the group consisting of aldehydes and ketones,

(13) a Schiff base reaction product of an alkylated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having 1–30 carbon atoms, and then reacting said alkylated polymer wtih a compound selected from the group consisting of aldehydes and ketones,

(14) an oxyalkylated Schiff base reaction product of a linear polymer of a 1,2-alkyleneimine, said linear polymer having a molecular weight of at least 800, each alkylene unit therein having 2–20 carbon atoms formed by reacting said linear polymer with a compound selected from the group consisting of aldehydes and ketones to form said Schiff base reaction product and then reacting said Schiff base reaction product, at a temperature of from about 80° C. to about 200° C. and a pressure of from about 10 p.s.i.

to about 200 p.s.i., with an alkylene oxide having at least 2 carbon atoms,

(15) an acylated, then olefinated linear polymer of a 1,2-alkyleneimine, said polymer having a molecular weight of at least 800, each alkylene unit therein having 2–20 carbon atoms, formed by reacting, at a temperature of from about 120° C. to about 300° C., said linear polymer with an acylating agent selected from the group consisting of (i) a carboxylic acid having 7–39 carbon atoms and (ii) a precursor of said carboxylic acid capable of forming said acid in said reaction, and then reacting said acylated polymer, at a temperature of from about 70° C. to about 100° C., with an olefinating agent selected from the group consisting of acrylonitrile, styrene, butadiene, vinyl ethers and vinyl sulfones, and

(16) an alkylated, then olefinated linear polymer of a 1,2-alkyleneimine, said polymer having a molecular weight of at least 800, each alkylene unit therein having 2–20 carbon atoms, formed by reacting, at a temperature of from about 100° C. to about 250° C., said polymer with a hydrocarbon halide alkylating agent having from 1–30 carbon atoms, and then reacting said alkylated polymer, at a temperature of from about 70° C. to about 100° C., with an olefinating agent selected from the group consisting of acrylonitrile, styrene, butadiene, vinyl ethers and vinyl sulfones.

5. The process of claim 4 wherein said linear polymer of a 1,2-alkyleneimine is polyethyleneimine.

6. The process of claim 4 wherein said linear polymer of a 1,2-alkyleneimine is polypropyleneimine.

No references cited.

ALEXANDER H. BRODMERKEL, *Primary Examiner.*

J. B. EVANS, *Assistant Examiner.*